(12) United States Patent
Kawase et al.

(10) Patent No.: US 6,870,584 B2
(45) Date of Patent: Mar. 22, 2005

(54) COLOR FILTER SUBSTRATE, METHOD FOR MANUFACTURING COLOR FILTER SUBSTRATE, LIQUID CRYSTAL DISPLAY DEVICE, ELECTRO-OPTICAL DEVICE, METHOD FOR MANUFACTURING ELECTRO-OPTICAL DEVICE, AND ELECTRONIC APPARATUS

(75) Inventors: Tomomi Kawase, Matsumoto (JP); Hisashi Aruga, Fujimi-machi (JP); Satoru Katagami, Hara-mura (JP); Tatsuya Ito, Maksumoto (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 10/185,005

(22) Filed: Jul. 1, 2002

(65) Prior Publication Data

US 2003/0001992 A1 Jan. 2, 2003

(30) Foreign Application Priority Data

Jun. 29, 2001 (JP) .......................................... 2001-199700
May 21, 2002 (JP) .......................................... 2002-146437

(51) Int. Cl.[7] ............................................. G02F 1/1333
(52) U.S. Cl. ....................... 349/106; 349/110; 349/122; 349/187
(58) Field of Search ................................. 349/106, 110, 349/122, 138, 187; 359/885, 500; 430/7, 302, 303, 320, 321; 347/106

(56) References Cited

U.S. PATENT DOCUMENTS 6,450,635 B1 * 9/2002 Okabe et al. ................ 347/106
6,630,274 B1 * 10/2003 Kiguchi et al. ................ 430/7
2001/0007733 A1 * 7/2001 Matsuyama et al. ........... 430/7
2002/0014470 A1 * 2/2002 Okada et al. .................. 216/24
2002/0081503 A1 * 6/2002 Kawase et al. ................. 430/7

FOREIGN PATENT DOCUMENTS

| CN | 1258428 A | 6/2000 | |
|---|---|---|---|
| EP | 0 989 778 A1 | 3/2000 | |
| EP | 1 061 383 A1 | 12/2000 | |
| JP | 10-062617 | * 3/1998 | |
| JP | 11-160515 | 6/1999 | |
| JP | 2000-17050 A | 1/2000 | |
| JP | 2000-187113 | 7/2000 | |
| KR | 2001-0041185 | 5/2001 | |
| WO | WO00/37972 | * 6/2000 | ............ G02B/5/20 |

* cited by examiner

*Primary Examiner*—Toan Ton
*Assistant Examiner*—Tai Duong
(74) *Attorney, Agent, or Firm*—Oliff & Berridge, PLC

(57) ABSTRACT

The present invention provides a color filer substrate in which color pixels of a plurality of colors are formed in the predetermined regions delimited by a bank-like delimiting member on the surface of a base member, and protective layer is formed on the color pixels, the surface of the protective layer is modified so as to have excellent flatness. The color filter substrate can include a bank-like delimiting member having a predetermined height formed on a base member so as to delimit color-pixel-forming regions on a surface of the base member, color pixels formed in the color-pixel-forming regions by arranging liquid color pixel materials, and a protective layer formed on the surfaces of the color pixels by arranging a liquid protective layer material. The delimiting member can be composed of a resin having repellency to the color pixel material and the protective layer material. The surface of the delimiting member can be subjected to surface treatment to decrease the repellency to the liquid material constituting the protective layer.

28 Claims, 26 Drawing Sheets

FIG. 3
(a) STRIPE 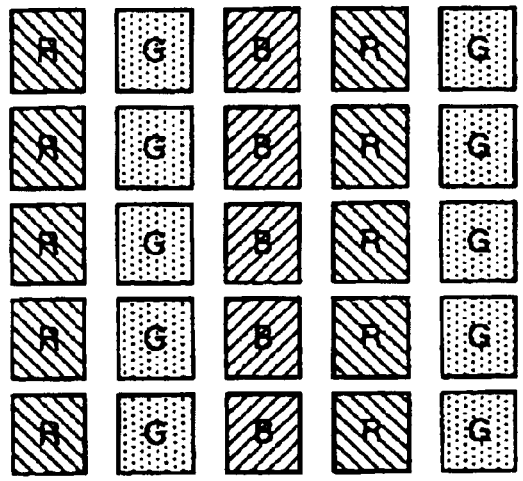
(b) MOSAIC 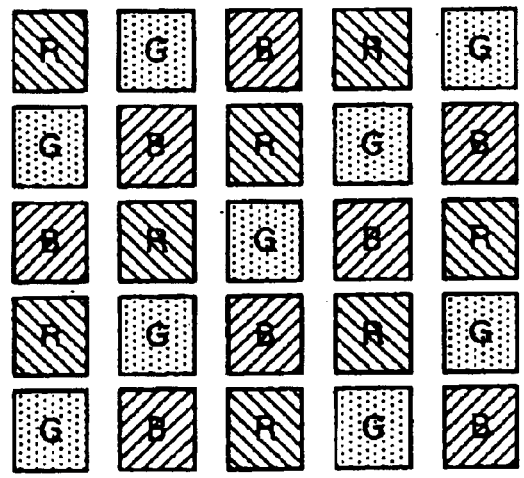
(c) DELTA 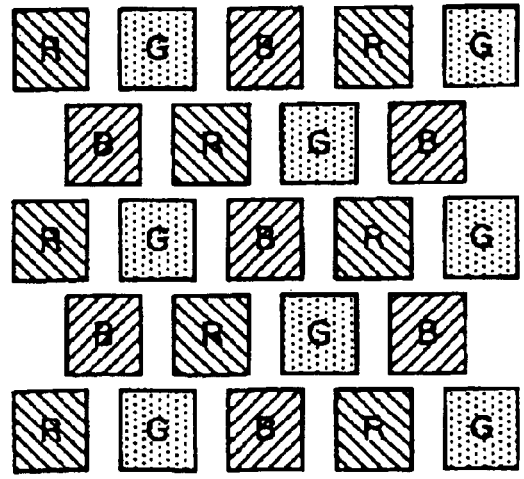

FIG. 4
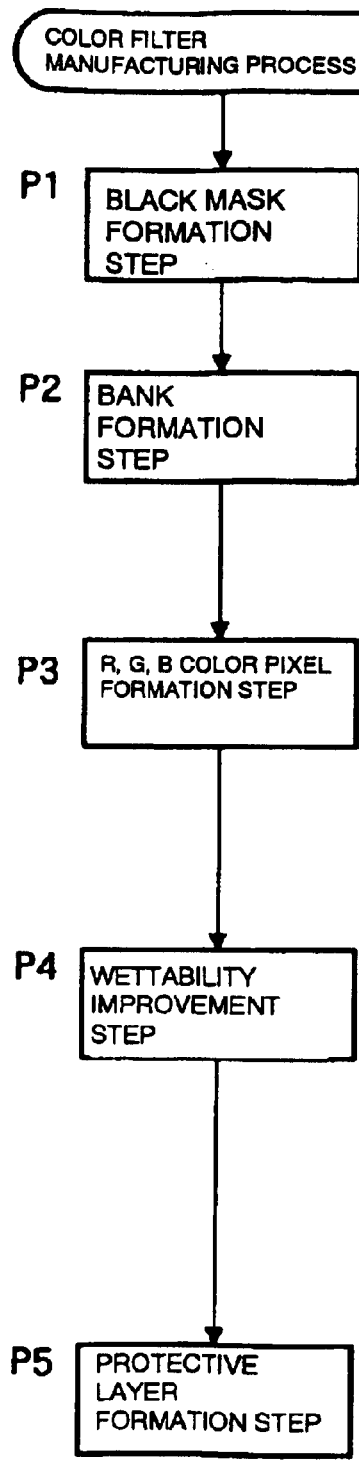
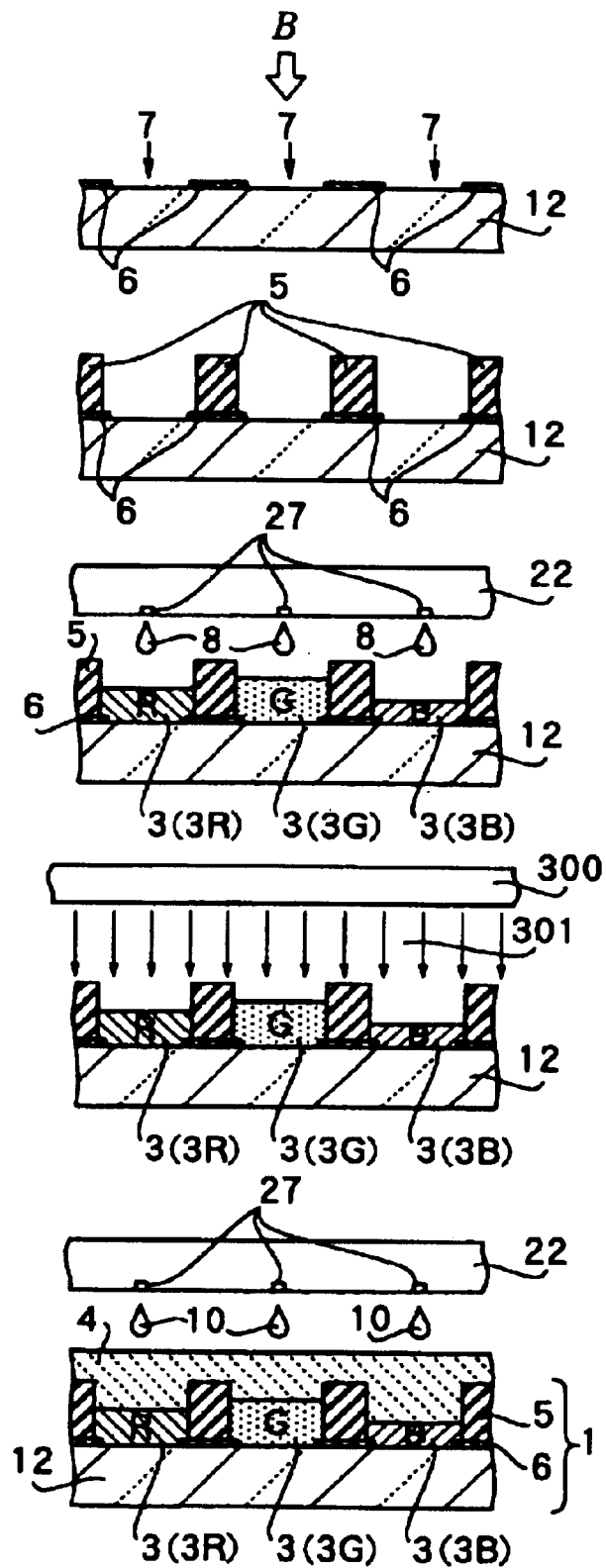

FIG. 8
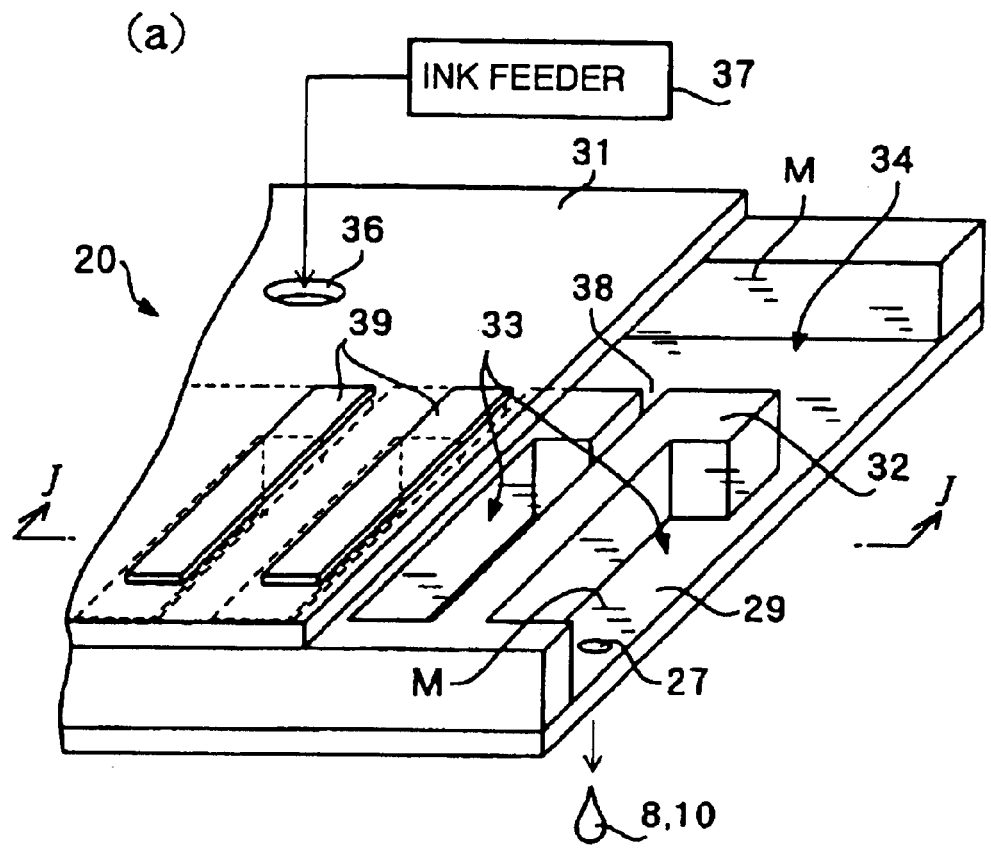
(a)
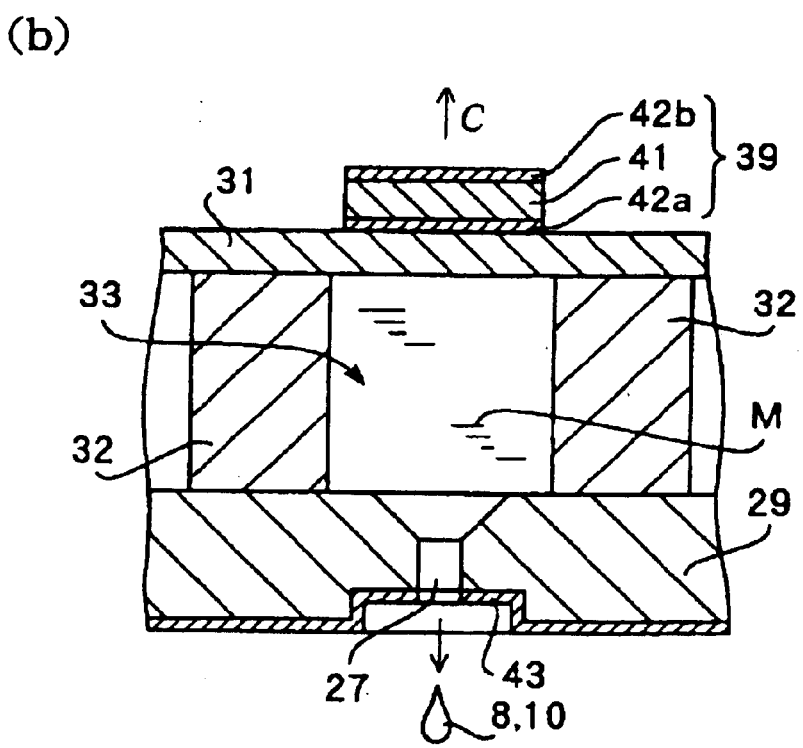
(b)

FIG. 26
(A)
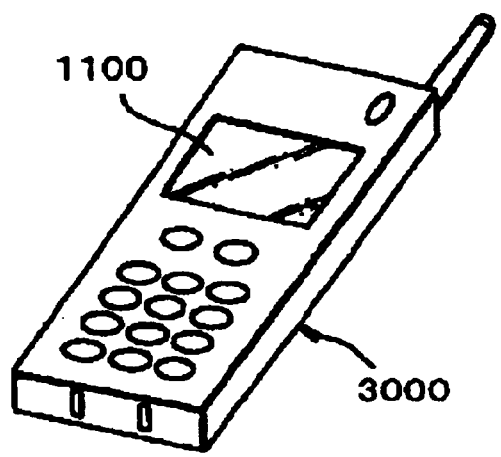
(B)
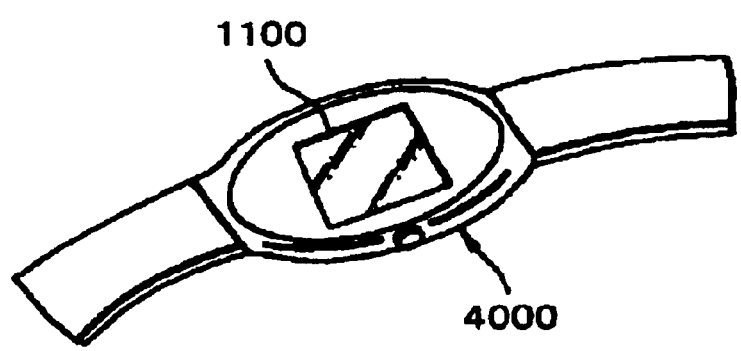
(C)
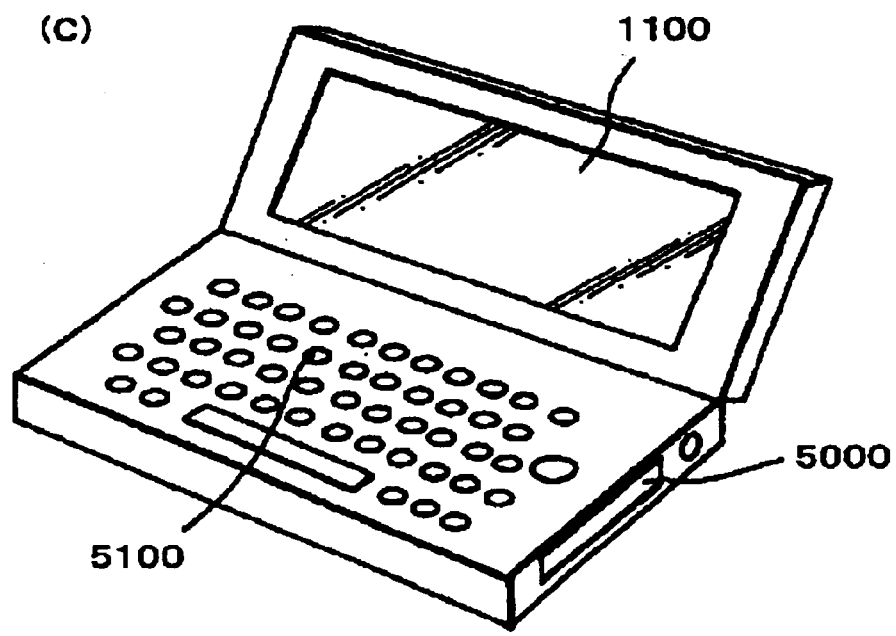

US 6,870,584 B2

COLOR FILTER SUBSTRATE, METHOD FOR MANUFACTURING COLOR FILTER SUBSTRATE, LIQUID CRYSTAL DISPLAY DEVICE, ELECTRO-OPTICAL DEVICE, METHOD FOR MANUFACTURING ELECTRO-OPTICAL DEVICE, AND ELECTRONIC APPARATUS

BACKGROUND OF THE INVENTION

1. Field of Invention

The present invention relates to color filter substrates suitable for use in liquid crystal display devices for electronic apparatuses, such as mobile phones and mobile personal computers. The present invention also relates to methods for manufacturing such color filter substrates. The present invention also relates to liquid crystal display devices and electro-optical devices including the color filter substrates and to methods for manufacturing the electro-optical devices.

More particularly, the present invention relates to a color filter substrate, in which a plurality of color pixels, such as R (red), G (green), and B (blue) pixels, or C (cyan), M (magenta), and Y (yellow) pixels, are formed in a predetermined region on a base member delimited by a bank-like delimiting member, and a protective layer is formed on the surfaces of the color pixels, to a method for manufacturing the color filter substrate, to a liquid crystal display device, to an electro-optical device, and to a method for manufacturing the electro-optical device.

2. Description of Related Art

Recently, liquid crystal display devices have been widely used for electronic apparatuses, such as mobile phones and mobile personal computers. Liquid crystal display devices in which color displays are performed using color filter substrates have also been widely used.

In a conventional color filter substrate, such as the one shown in FIG. 18, on the surface of a base member 201 composed of glass, plastic, or the like, for example, color pixels 202R, 202G, and 202B of R (red), G (green), and B (blue), respectively, are arranged in a predetermined pattern, such as a stripe pattern, a mosaic pattern, or a delta pattern, and a protective layer 203 is further formed thereon.

The protective layer 203 is formed in order to perform the following four functions. Firstly, by forming the protective layer 203, the surface of the color filter substrate is planarized, and thereby, when electrodes are formed on the surface of the color filter substrate, the function of preventing the disconnection of the electrodes is performed.

Secondly, the protective layer 203 is formed so that the function of improving the contrast ratio between pixels is performed by reducing resistance of the electrodes on the protective layer 203. Thirdly, the protective layer 203 is formed in order to prevent the pixels included in the color filter from being flawed in the steps subsequent to the formation of the protective layer 203, that is, in order to perform the protective function.

Fourthly, when the color filter substrate is used for a liquid crystal display device, by forming the protective layer 203, it is possible to prevent impurities from being diffused from the color filter substrate into the liquid crystal after the liquid crystal is filled in the cell gap.

When such a protective layer 203 is formed, conventionally, in general, a black mask is formed on the base member 201, and a plurality of color pixels, such as R (red), G (green), and B (blue) pixels, or C (cyan), M (magenta), and Y (yellow) pixels, are formed in a predetermined region delimited by the black mask. A liquid transparent resist or the like is then applied over the entire surface of the base member 201 provided with the color pixels at a uniform thickness by spin-coating or the like, and the transparent resist or the like is subjected to patterning by a photolithographic method to form the protective layer 203.

However, when the photolithographic method is used, problems, such as an increase in costs, arise because the process is complex and large amounts of the individual color materials, the photoresist, etc. are consumed. In order to overcome such problems, a method has been proposed in which a filament or the like is arranged in a dot pattern by ejecting materials for the filter or the like in a dot pattern by an ink-jet method.

That is, as shown in FIG. 19(a), first, a bank-like delimiting member 5 is formed on a glass base member 12 at a predetermined height. The delimiting member 5 is composed of a resinous material which has repellency to materials 13 for the filter (see FIG. 19(b)) ejected by the ink-jet method. Therefore, as shown in FIG. 19(b), when the filament or the like is formed by supplying the materials 13 for the filter to the individual regions, it is possible to prevent the adjacent materials 13 for the filter to be mixed with each other.

In this way, as shown in FIG. 19(c), the filament or the like composed of the color pixels 3R, 3G, and 3B having different colors is formed. Furthermore, as shown in FIG. 19(d), a protective layer 4 is applied on the color pixels 3R, 3G, and 3B, and the color filter substrate is thereby manufactured.

SUMMARY OF THE INVENTION

However, in the conventional method, as shown in FIG. 19, the bank-like delimiting member 5 is usually composed of a resin having repellency to the liquid material constituting the protective layer 4. Therefore, the delimiting member 5 and the liquid material of the protective layer 4 applied thereon repel each other, which may result in uneven application of coating on the protective layer 4 on the surface of the delimiting member 5. When the color filter substrate in which the protective layer 4 is coated unevenly is used as a component of a display device, variations in color tone occur in an image displayed by the display device.

The present invention has been achieved in view of the problems described above. It is an object of the present invention to form a protective layer so that the surface thereof has excellent flatness in a color filter substrate, in which color pixels of a plurality of colors are formed in predetermined regions on the surface of a base member delimited by a bank-like delimiting member, and the protective layer is formed on the color pixels.

By achieving the object described above, it is an object of the present invention to prevent the disconnection of electrodes effectively when the electrodes are formed on the surface of the color filter substrate. When the color filter substrate is used as a component of a display device, it is an object of the present invention to reduce variations in color tone in the image displayed by the display device. Moreover, it is another object of the present invention to provide an electronic apparatus provided with the liquid crystal display device or the electro-optical device described above.

The present inventions takes advantage of findings that by surface-treating the surface of a bank-like delimiting member to decrease the repellency to a liquid material constituting a protective layer before forming the protective layer, planarization of the surface of the protective layer is ensured, and thus the present invention has been completed. That is, the present invention provides the color filter substrate, the method for manufacturing the same, and the liquid crystal display device described below.

A color filter substrate in accordance with the present invention can include a base member, a bank-like delimiting member formed at a predetermined height on the base member so as to delimit color-pixel-forming regions having a predetermined pattern on the surface of the base member, color pixels formed in the color-pixel-forming regions by applying liquid color pixel materials, and a protective layer formed on the surfaces of the color pixels by applying a liquid protective layer material. The delimiting member can be composed of a resin having repellency to the color pixel materials and to the protective layer material, and the surface of the delimiting member is subjected to surface treatment to decrease the repellency to the protective layer material.

In the color filter substrate of the present invention, a protective layer having excellent flatness can be formed. Therefore, when electrodes are formed on the surface of the color filter substrate, it is possible to prevent the disconnection of the electrodes effectively. When the color filter substrate is used as a component of a display device, it is possible to reduce variations in color tone in the image displayed by the display device.

In the color filter substrate of the present invention, the protective layer may be formed so that the thickness thereof partially varies. In such a construction, even when the plurality of color pixels formed on the base member have thicknesses that vary among the regions delimited by the delimiting member, it is possible to planarize the surface of the color filter substrate. It is also possible to prevent the unevenness of the color pixels from appearing on the surface of the color filter substrate.

In the color filter substrate of the present invention, the bank-like delimiting member may be composed of a material including a fluorocarbon resin or a silicone resin. The protective layer may be composed of a material including at least one resin selected from the group consisting of acrylic resins, epoxy resins, imide resins, and fluorocarbon resins.

In such a construction, the protective layer can fully exhibit the four functions described above. In such a case, the delimiting member is preferably composed of a material having a contact angle of 25° or more with respect to the color pixel materials.

In the color filter substrate of the present invention, preferably, the protective layer material has a viscosity of 3 to 50 mPa·s. Consequently, it is possible to form the protective layer smoothly and efficiently.

In the color filter substrate of the present invention, preferably, the surface treatment includes treatment based on oxygen (O2) plasma ashing, atmospheric plasma ashing, or UV ashing. Consequently, the wettability of the delimiting member to the liquid material constituting the protective layer can be increased, and uneven application of the protective layer material can be prevented. Thereby, flatness of the surface of the protective layer is ensured.

In the color filter substrate of the present invention, preferably, the surface treatment is performed so that the contact angle of the protective layer with respect to the base member is 20° or less. Consequently, it is possible to form the protective layer without uneven application of coating.

In the color filter substrate of the present invention, a light-shielding layer may be formed in a predetermined pattern on the surface of the base member. In such a case, the bank-like delimiting member may be formed on the surface of the light-shielding layer.

In the color filter substrate of the present invention, the bank-like delimiting member may have a light-shielding effect, and in such a case, the delimiting member also functions as a light-shielding layer.

In the color filter substrate of the present invention, the light-shielding layer may function as a black mask.

Next, a method for manufacturing a color filter substrate in accordance with the present invention can include the steps of forming a bank-like delimiting member at a predetermined height on a base member so as to delimit color-pixel-forming regions having a predetermined pattern on the surface of the base member, forming color pixels by applying liquid color pixel materials to the color-pixel-forming regions on the surface of the base member; and forming a protective layer by applying a liquid protective layer material to the surfaces of the color pixels. The delimiting member can be composed of a resin having repellency to the color pixel materials and to the protective layer material, and the surface of the delimiting member is subjected to surface treatment to decrease the repellency to the protective layer material. In this manufacturing method, after the surface of the delimiting member is subjected to the surface treatment to decrease the repellency to the protective layer material, the protective layer is formed by applying the protective layer material onto the surfaces of the color pixels.

In accordance with the method for manufacturing the color filter substrate described above, it is possible to obtain a color filter substrate in which disconnection of electrodes and variations in color tone are prevented effectively when used in a display device.

In the method for manufacturing the color filter substrate described above, a material including a fluorocarbon resin or a silicone resin may be used as the bank-like delimiting member. A material including at least one resin selected from the group consisting of acrylic resins, epoxy resins, imide resins, and fluorocarbon resins may also be used as the protective layer. Additionally, preferably, a material having a contact angle of 25° or more with respect to the color pixel materials is used for the delimiting member.

In the method for manufacturing the color filter substrate described above, preferably, the protective layer material has a viscosity of 3 to 50 mPa·s.

In the method for manufacturing the color filter substrate described above, preferably, the surface treatment includes treatment based on oxygen (O2) plasma ashing, atmospheric plasma ashing, or UV ashing.

In the method for manufacturing the color filter substrate described above, preferably, the surface treatment is performed so that the contact angle of the protective layer with respect to the base member is 20° or less.

In the method for manufacturing the color filter substrate described above, preferably, a light-shielding layer is formed in a predetermined pattern on the surface of the base member, and the bank-like delimiting member is formed on the surface of the light-shielding layer.

In the method for manufacturing the color filter substrate described above, preferably, the bank-like delimiting member is formed so as to have a light-shielding effect and the delimiting member also functions as a light-shielding layer. This light-shielding layer can function as a black mask for enhancing the display contrast in a liquid crystal display device.

In the method for manufacturing the color filter substrate described above, the color pixels may be formed by ejecting droplets of the color pixel materials into the color-pixel-forming regions formed on the surface of the base member.

Such a construction may be achieved by selecting the color pixel materials as inks to be ejected by a so-called ink-jet ink-ejection method. In such a case, as the ink-jet method, a method of ejecting ink using elastic deformation of a piezoelectric element, a method of ejecting ink using thermal expansion of ink, or any other given method may be employed.

In the method for manufacturing the color filter substrate described above, since inks, i.e., the color pixel materials, can be supplied to the individual positions in the plurality of regions on the base member in desired amounts, it is possible to manufacture a color filter substrate of high resolution. Since the color pixel materials can be ejected by highly controlling the ejection amount, etc. for each of the plurality of regions, the color pixel materials are prevented from being wasted, and the color filter substrate can be manufactured inexpensively.

In the method for manufacturing the color filter substrate described above, the protective layer may be formed by ejecting droplets of the protective layer material onto the surfaces of the color pixels. Such a construction may be achieved by forming a film by so-called spin-coating method or by selecting the protective layer material as an ink to be ejected by ink-jet ejection method.

Next, a liquid crystal display device in accordance with the present invention can include a color filter substrate, pixel electrodes formed on the color filter substrate, an opposing substrate opposing the color filter substrate, and a liquid crystal disposed between the color filter substrate and the opposing substrate. The color filter substrate includes a base member, a bank-like delimiting member formed at a predetermined height on the base member so as to delimit color-pixel-forming regions having a predetermined pattern on the surface of the base member, color pixels formed in the color-pixel-forming regions formed on the surface of the base member by applying liquid color pixel materials, and a protective layer formed on the surfaces of the color pixels by applying a liquid protective layer material. The delimiting member included in the color filter substrate can be composed of a resin having repellency to the color pixel materials and to the protective layer material, and the surface of the delimiting member is subjected to surface treatment to decrease the repellency to the protective layer material.

In the liquid crystal display device having the construction described above, disconnection of the electrodes and variations in color tone can be prevented effectively.

In the liquid crystal display device having the construction described above, the bank-like delimiting member in the color filter substrate may be composed of a material including a fluorocarbon resin or a silicone resin, and the protective layer may be composed of a material including at least one resin selected from the group consisting of acrylic resins, epoxy resins, imide resins, and fluorocarbon resins.

In the liquid crystal display device having the construction described above, in the color filter substrate, the protective layer material preferably has a viscosity of 3 to 50 mPa·s.

In the liquid crystal display device having the construction described above, in the color filter substrate, the surface treatment preferably includes treatment based on oxygen (O2) plasma ashing, atmospheric plasma ashing, or UV ashing.

In the liquid crystal display device having the construction described above, in the color filter substrate, the surface treatment is preferably performed so that the contact angle of the protective layer with respect to the base member is 20° or less. In such a construction, it is possible to form the protective layer without uneven application of coating.

In the liquid crystal display device having the construction described above, preferably, the color filter substrate further includes a light-shielding layer formed in a predetermined pattern on the surface of the base member, and the bank-like delimiting member is preferably formed on the surface of the light-shielding layer.

In the liquid crystal display device having the construction described above, in the color filter substrate, the bank-like delimiting member is preferably formed so as to have a light-shielding effect and the delimiting member preferably also functions as a light-shielding layer.

In the liquid crystal display device including the light-shielding layer described above, the light-shielding layer may function as a black mask.

In the liquid crystal display device having the construction described above, preferably, the liquid crystal is either a STN (Super Twisted Nematic) liquid crystal or a TN (Twisted Nematic) liquid crystal.

Since the liquid crystal display device using the STN liquid crystal or the TN liquid crystal performs a display making use of birefringence of the liquid crystal, the thickness of the liquid crystal layer formed by a pair of substrates must be uniform over the entire surface of the display region. Therefore, such a construction which ensures the flatness of the portion of the color filter substrate is used particularly effectively when the STN liquid crystal or the TN liquid crystal is used.

Next, an electro-optical device in accordance with the present invention can include a color filter substrate and an electro-optical material provided on the color filter substrate. The color filter substrate can include a base member, a bank-like delimiting member formed at a predetermined height on the base member so as to delimit color-pixel-forming regions having a predetermined pattern on the surface of the base member, color pixels formed in the color-pixel-forming regions on the surface of the base member by applying liquid color pixel materials, and a protective layer formed on the surfaces of the color pixels by applying a liquid protective layer material. The delimiting member can be composed of a resin having repellency to the color pixel materials and to the protective layer material, and the surface of the delimiting member is subjected to surface treatment to decrease the repellency to the protective layer material.

Additionally, examples of electro-optical devices are considered to include liquid crystal display devices using liquid crystals as electro-optical materials, EL devices using EL elements as electro-optical materials, plasma display devices using gases as electro-optical materials, and various other devices.

Next, an electro-optical device in accordance with the present invention can include a base member, a bank-like delimiting member formed on the base member so as to delimit color-pixel-forming regions on the surface of the base member, color pixels formed in the color-pixel-forming regions by applying liquid color pixel materials, and a protective layer formed on the delimiting member and the color pixels by applying a liquid protective layer material. The delimiting member includes a material having low wettability to the liquid color pixel materials and to the liquid protective layer material, and the surface of the delimiting member in the section in contact with the protective layer material is subjected to surface treatment to increase the wettability to the liquid protective layer material compared to the remaining section.

Next, a method for manufacturing an electro-optical device in accordance with the present invention can include the steps of forming a bank-like delimiting member including a material having low wettability to color pixel materials and to a protective layer material on a base member so as to delimit color-pixel-forming regions on the surface of the base member, forming color pixels by ejecting droplets of the color pixel materials into the color-pixel-forming regions from nozzles, surface-treating the exposed section of the surface of the delimiting member so as to improve the wettability compared to the remaining section, and forming the protective layer by applying the liquid protective layer material onto the delimiting member and the color pixels.

Next, an electronic apparatus in accordance with the present invention can include a liquid crystal display device having the construction described above.

According to the constructions described above, by incorporating operational effect of the liquid crystal display device or the electro-optical device in accordance with the present invention, it is possible to reduce variations in color tone in the image displayed by the device.

BRIEF DESCRIPTION OF THE DRAWINGS

The invention will be described with reference to the accompanying drawings, wherein like numeral represent like elements, and wherein:

FIG. 2(a) shows one color filter substrate, and FIG. 2(b) shows a mother substrate having a large area on which a plurality of color filter substrates are formed;

FIGS. 3(a), 3(b), and 3(c) are plan views showing examples of arrangements of display dots of three colors of R (red), G (green), and B (blue);

FIG. 4 is a schematic diagram which shows the steps of manufacturing a color filter substrate in an embodiment of the present invention;

FIG. 8(a) is a perspective view showing the internal structure of a head section of an ink-jet head, and FIG. 8(b) is a sectional view taken along the line J—J of FIG. 8(a);

FIGS. 26(A) to 26(C) show electronic apparatuses according to the present invention, FIG. 26(A) shows a mobile phone, FIG. 26(B) shows a wristwatch, and FIG. 26(C) shows a mobile information apparatus.

DETAILED DESCRIPTION OF PREFERRED EMBODIMENTS

The embodiments of color filter substrates, methods for manufacturing the same, and liquid crystal display devices in accordance with the present invention will be described below in detail with reference to the drawings.

Figure 1:
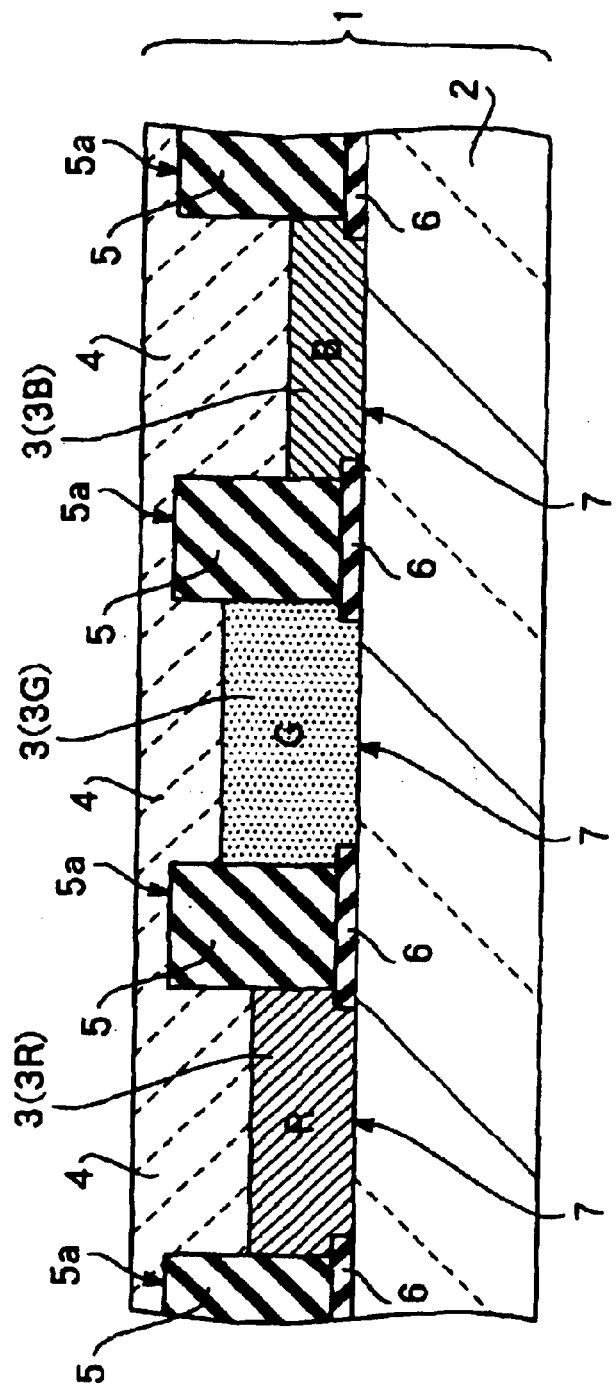
FIG. 1 is an enlarged sectional view which schematically shows the structure of one pixel section of a color filter substrate in an embodiment of the present invention.

FIG. 1 is a sectional view showing the structure of a color filter substrate in an embodiment of the present invention. As shown in FIG. 1, a color filter substrate 1 includes a base member 2, a bank-like delimiting member 5 formed on the base member 2, color pixels 3, and a protective layer 4.

The delimiting member 5 is formed at a predetermined height on the base member 2 so as to delimit color-pixel-forming regions 7 having a predetermined pattern on the surface of the base member 2. The color pixels 3 are formed in the color-pixel-forming regions 7 by arranging liquid color pixel materials. The protective layer 4 is formed on the surfaces of the color pixels 3 by arranging a liquid protective layer material.

The delimiting member 5 is composed of a resin having repellency to the color pixel materials and to the protective layer material, and the surface 5a thereof is subjected to surface treatment to decrease the repellency to the liquid protective layer material.

It should be understood that the material for the delimiting member 5 is not particularly limited as long as it can prevent the adjacent color pixels 3 from being mixed with each other. For example, the delimiting member 5 may be composed of a material including a fluorocarbon resin or a silicone resin. These resins may be used alone or in combination of not less than two of them. Preferably, the delimiting member 5 is composed of a material including a fluorocarbon resin, and in particular, a material having a contact angle of 25° or more to the color pixel materials.

Additionally, it should be understood that the material for the protective layer 4 is not particularly limited as long as it can exhibit the four functions described above. For example, the protective layer 4 may be composed of a material including at least one resin selected from the group of acrylic resins, epoxy resins, imide resins, and fluorocarbon resins.

Preferably, the protective layer 4 is formed by ejecting droplets of the protective layer material on the surfaces of the color pixels 3 using an ink-jet method. In such a case, the liquid material for the protective layer 4 preferably has a viscosity of 3 to 50 mPa·s. If the viscosity is less than 3 mPa·s, the fluidity may become too high to form a layer (i.e., film). On the other hand, if the viscosity exceeds 50 mPa·s, the fluidity may become too low to form a uniform layer (i.e., film) over the entire region of the base member 2.

The surface 5a of the bank-like delimiting member 5 is subjected to surface treatment to decrease the repellency to the liquid material constituting the protective layer 4. Herein, the repellency to the liquid material constituting the protective layer 4 means that the contact angle of the delimiting member 5 with respect to the liquid material constituting the protective layer 4 is large, that is, the wettability of the delimiting member 5 with respect to the liquid material constituting the protective layer 4 is small. If the wettability is small, uneven application of the protective layer 4 occurs on the surface 5a of the delimiting member 5, and the flatness of the surface of the protective layer 4 is impaired.

By performing the surface treatment as described above on the surface 5a of the delimiting member 5, even when the surface 5a has repellency to the liquid material constituting the protective layer 4, it is possible to increase the wettability to the liquid material constituting the protective layer 4, and uneven application of the protective layer 4 can be prevented. Therefore, the flatness of the surface of the protective layer 4 is ensured.

The surface treatment is not particularly limited as long as uneven application of the protective layer 4 can be prevented by increasing the wettability to the liquid material constituting the protective layer 4 (i.e., by modifying the surface); for example, treatment by oxygen (O2) plasma ashing, atmospheric plasma ashing, or UV ashing may be performed.

Herein, oxygen (O2) plasma ashing means treatment in which the base member 2 is irradiated with oxygen (O2) and a plasma in a vacuum, and preferably the treatment is performed so that the contact angle of the protective layer to the base member 2 is 20° or less.

Atmospheric plasma ashing means treatment in which the base member 2 is irradiated with a plasma in air, and preferably the treatment is performed so that the contact angle of the protective layer to the base member 2 is 20° or less.

UV ashing means treatment in which the base member 2 is irradiated with UV light in a vacuum or in air, and preferably the treatment is performed so that the contact angle of the protective layer to the base member 2 is 20° or less.

In this embodiment, as shown in FIG. 1, a light-shielding layer 6 is formed in a predetermined pattern on the surface of the base member 2, and the bank-like delimiting member 5 is formed on the surface of the light-shielding layer 6. The light-shielding layer 6 functions as a so-called black mask or black mask to enhance the contrast of display images by shielding the peripheries of the individual color pixels 3 from light.

The delimiting member 5 itself may have a light-shielding effect. In such a case, the delimiting member 5 also functions as the light-shielding layer 6.

FIG. 2(a) is a plan view showing a color filter substrate in an embodiment of the present invention. FIG. 1 is a sectional view taken along the line I—I of FIG. 2(a). As shown in FIG. 2(a), the delimiting member 5 and the light-shielding layer 6 located thereunder are formed on the base member 2 so as to delimit the color-pixel-forming regions 7 having a predetermined pattern on the surface of the base member 2. That is, the delimiting member 5 and the light-shielding layer 6 located thereunder are formed in a grid pattern in which regions for forming the color pixels 3 correspond to grid openings, and the color pixels 3 are formed so as to fill the grid openings. Thus, a plurality of color pixels 3 are formed on the surface of the base member 2 in a dot pattern, and in the case shown in FIG. 2(a), in a dot matrix.

In the color filter substrate shown in FIG. 1, the light-shielding layer 6 is composed of a metal or resinous material which does not transmit light (i.e., which shields light). Each color pixel 3 is composed of a coloring material of any one of the colors selected from the group consisting of, for example, R (red), G (green), and B (blue). The color pixels 3 of the individual colors are arranged in a predetermined pattern. Examples of arrangements include, a stripe pattern shown in FIG. 3(a), a mosaic pattern shown in FIG. 3(b), and a delta pattern shown in FIG. 3(c).

In the stripe pattern, colors are arranged so that all of the color pixels in a single column of a matrix are of a single color. In the mosaic pattern, colors are arranged so that any three color pixels aligned vertically or horizontally correspond to three colors of R (red), G (green), and B (blue). In the delta pattern, alternate rows are staggered and any three adjacent color pixels correspond to three colors of R (red), G (green), and B (blue).

As shown in FIG. 2(a), with respect to the size of the color filter substrate 1, for example, the diagonal size T0 is 1.8 inches. With respect to the size of one color pixel, for example, horizontal length L0' vertical length L1 is 30 mm' 100 mm. The distance between the adjacent two color pixels 3, i.e., a so-called pitch P0 between elements, is, for example, 75 mm.

In the color filter substrate shown in FIG. 1, the heights (i.e., thicknesses) of the color pixels 3R, 3G, and 3B may be smaller than the height of the delimiting member 5 or may be larger than the height of the delimiting member 5. The individual color pixels may have the same thickness or different thicknesses. When the color pixels are formed so as to have different thicknesses, for example, the thickness of the G color pixel 3G may be the largest, the thickness of the R color pixel 3R may be the next largest, and the thickness of the B color pixel 3B may be the smallest. The primary reason for forming the color pixels so as to have different thicknesses as described above is that a specific color is enhanced or attenuated according to the observer's desire. Alternatively, the thickness of the G color pixel 3G which has a large visual effect on the resolution may be formed smaller than the other color pixels.

When the individual color pixels 3R, 3G, and 3B have different thicknesses, the protective layer 4 is formed so as to thickness that varies according to the different thicknesses of the color pixels 3R, 3G, and 3B.

When the color filter substrate 1 is used as a color filter substrate in a liquid crystal display device, electrodes are provided on the surfaces of the color pixels 3 as in FIG. 1. In such a case, if the color filter substrate 1 in which the color pixels 3 are formed have an uneven surface, steps may occur in the electrodes, resulting in disconnection of the electrodes. In contrast, as is the case of the present invention, by forming a protective layer 4 so that the surface thereof has excellent flatness, disconnection of the electrodes can be prevented reliably.

When the color filter substrate 1 is used as an optical element for full color display, pixels, each including three color pixels 3 of R (red), G (green), and B (blue) as a unit, are formed, and a full color display can be performed by passing light selectively through any one of the R (red), G (green), and B (blue) regions in the pixel or a combination thereof. In such a case, the light-shielding layer 6 can prevent light from leaking out from sections other than the color pixels 3.

With respect to the color filter substrate 1 shown in FIG. 2(a), a plurality of color filter substrates may be formed on a mother substrate 12 having a large area as shown in FIG. 2(b). Specifically, first, a pattern for one color filter substrate 1 is formed on each of a plurality of color-filter-forming regions 11 arranged in the mother substrate 12. Furthermore, cutting grooves are formed around the color-filter-forming regions 11 and the mother substrate 12 is cut along the scribing lines, and thereby the individual color filter substrates 1 are formed.

When a liquid crystal display device is taken into consideration, a common electrode substrate, which is another substrate, is bonded to the color filter substrate shown in FIG. 1. A plurality of common electrode substrates may also be formed on a mother substrate having a large area. The cutting step described above may be performed after a mother substrate for the color filter substrates 1 and a mother substrate for the common electrode substrates are bonded together to form a pair of glass substrates.

Figure 2:
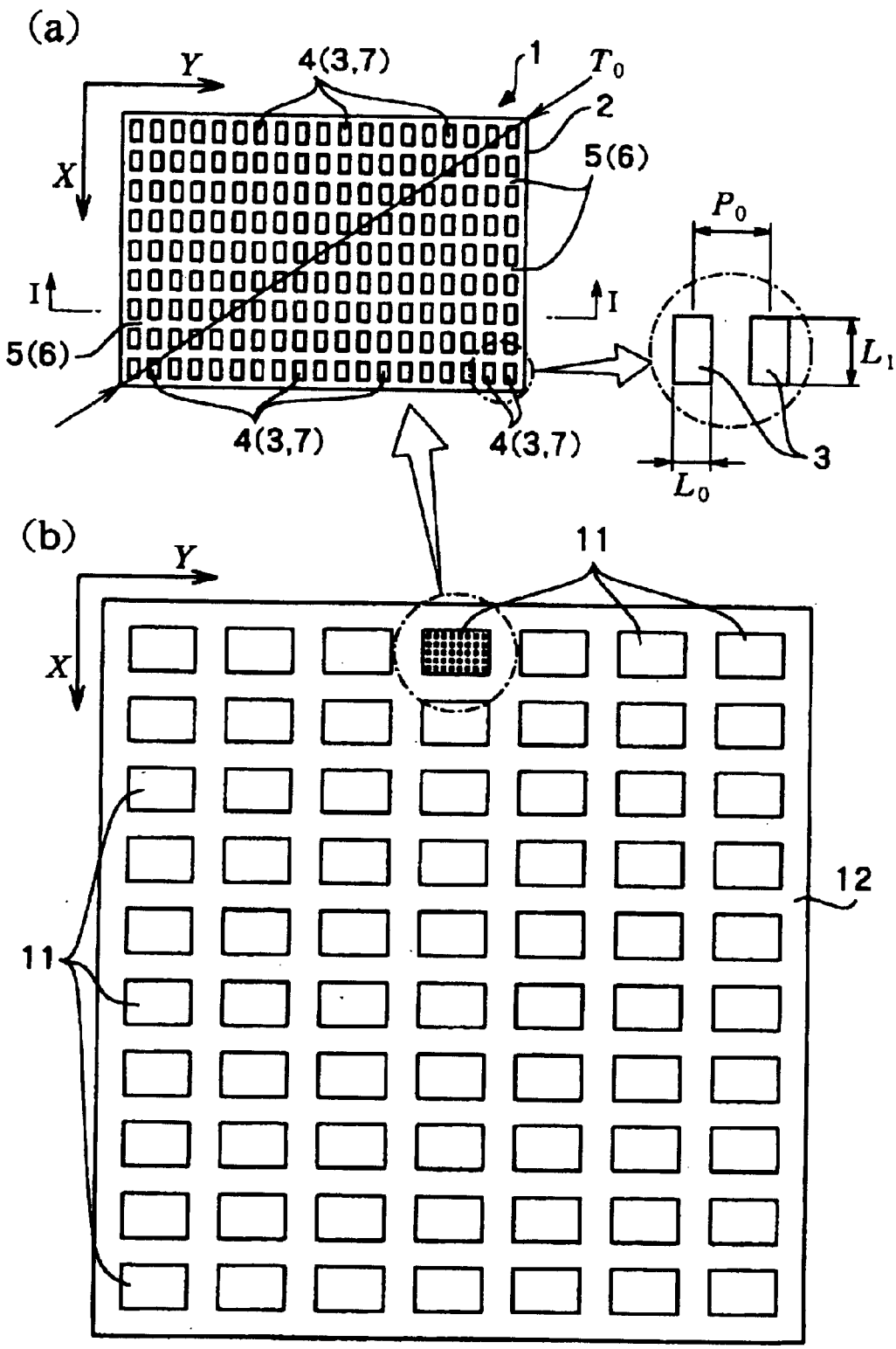
FIGS. 2(a) and 2(b) are plan views which show color filter substrates obtained by the manufacturing method of the present invention.

A method for manufacturing a color filter substrate in accordance with the present invention will be described below in which the color filter substrate 1 shown in FIG. 2 (a) is taken as an example.

FIG. 4 shows a method for manufacturing the color filter substrate 1 step by step schematically. First, the light-shielding layer 6 is formed in a grid pattern when viewed from the direction indicated by the arrow B, using a metal or resinous material which does not transmit light, for example, Cr (chromium), on the surface of a mother substrate 12 composed of glass, plastic, or the like. Grid openings in the grid pattern correspond to regions in which color pixels 3 are formed, i.e., the color-pixel-forming regions 7. The planar size of each color-pixel-forming region 7 formed by the light-shielding layer 6, viewed from the direction indicated by the arrow B, is, for example, approximately 30 mm'100 mm.

In order to form the light-shielding layer 6, a material (for example, Cr) is deposited at a uniform thickness of approximately 0.1 to 0.2 mm by a given deposition method (such as sputtering), and then the grid pattern is formed by an appropriate patterning method (such as photolithography) (step P1).

After the shielding layer 6 is formed, in step P2, the bank-like delimiting member 5 is formed. Specifically, a resinous material for forming the delimiting member 5 is formed at a predetermined thickness by a spin-coating method, and then a predetermined grid pattern is formed by an appropriate patterning method (such as photolithography). The resinous material has repellency to the liquid material for the protective layer 4, and preferably, has ink-repellent properties. Additionally, the width of the light-shielding layer 6 and the width of the delimiting member 5 do not necessarily agree with each other. Under normal circumstances, the width of the light-shielding layer 6 is larger than or substantially the same as the width of the delimiting member 5.

Next, in step P3, color pixels 3 of R (red), G (green), and B (blue) are formed in the regions 7 delimited by the delimiting member 5, for example, using an ink-jet method. Specifically, while the surface of the mother substrate 12 is scanned by moving an ink-jet head 22, materials 8 for color pixels are ejected as ink droplets from nozzles 27 provided on the ink-jet head 22 at a predetermined timing corresponding to any one of the array patterns shown in FIG. 3 and are deposited on the mother substrate 12. The color pixel materials 3 are then dried and solidified by firing treatment, ultraviolet irradiation treatment, or vacuum drying treatment. By repeating the above-mentioned process for each of the color pixels 3R, 3G, and 3B, the color pixel pattern can be formed with the desired arrangement.

Next, in step P4, a wettability improvement processor 300, which is not in contact with the mother substrate 12, is put into operation, and wettability improvement treatment is performed by the application of a treating material 301, such as oxygen gas or UV light. By this treatment, the contact angle of the liquid material, for example, the protective layer material, with respect to the mother substrate 12 is decreased, and the ink-repellent properties are decreased. The wettability improvement treatment described above is not particularly limited as long as the wettability to the liquid material is increased, that is, the surface is modified, and uneven application of coating is prevented, for example, oxygen ($O_2$) plasma ashing, atmospheric plasma ashing, or UV ashing may be selected.

Next, in step P5, the protective layer 4 is formed on the color pixels 3 in the regions 7 delimited by the delimiting member 5, for example, using an ink-jet method. Specifically, in the same manner as that in the case of the color pixels 3, while the surface of the mother substrate 12 is scanned by moving the ink-jet head 22, a material 10 for the protective layer is ejected as ink droplets from nozzles 27 provided on the ink-jet head 22 at a predetermined timing corresponding to any one of the array patterns shown in FIG. 3 and is deposited on the individual color pixels 3 on the mother substrate 12. The protective layer material is then dried and set, for example, by firing treatment at 200° C. for 30 to 60 minutes, and thus the protective layer 4 is formed in the shape of a film.

Additionally, in the ink-jet treatment in color pixel formation step P3, color pixels may be formed by repeated scanning of the ink-jet head 22 for each color of R (red), G (green), and B (blue), or three colors of R (red), G (green), and B (blue) may be formed simultaneously by single scanning of an ink-jet head 22 in which nozzles for three colors of R (red), G (green), and B (blue) are arranged.

On the other hand, in the ink-jet treatment in the protective layer formation step P5, preferably, a predetermined amount of ink (i.e., the protective layer material) droplets are supplied to the entire surface of the mother substrate 12 during single scanning of the ink-jet head 22. However, when the color pixels 3 formed in the grid openings have different thicknesses for each of the colors of R (red), G (green), and B (blue), preferably, the amount of ink (i.e., the protective layer material) ejected from the nozzles 27 is adjusted appropriately.

The ink jet head 22 used in the color pixel formation step P3 and the ink-jet head 22 used in the protective layer formation step P5 may be mounted on the same ink-jet apparatus in turn or may be mounted on different ink-jet apparatuses so that the ink-jet apparatuses are used separately.

In some cases, the same ink-jet head 22 and the same ink-jet apparatus on which the ink-jet head 22 is mounted may be used, and inks to be supplied to the ink-jet head 22 may be changed depending on whether the color pixel materials are used or the protective layer material is used.

Although the method for scanning the mother substrate 12 with the ink-jet head 22 in the color pixel formation step P3 and the protective layer formation step P5 is not particularly limited, for example, a method may be employed in which a plurality of nozzles 27 are aligned to form a nozzle row with a length substantially the same as one side of the mother substrate 12, and the materials 8 for the color pixels and the material 10 for the protective layer are supplied to the entire surface of the mother substrate 12 by single scanning.

Alternatively, with respect to an ink-jet head 22 having a nozzle row with a length shorter than a side of the mother substrate 12, a method may be employed in which the inks are supplied to the entire surface of the mother substrate 12 by repeating main scanning for ejecting the inks and subscanning for shifting the main scanning position.

Figure 5:
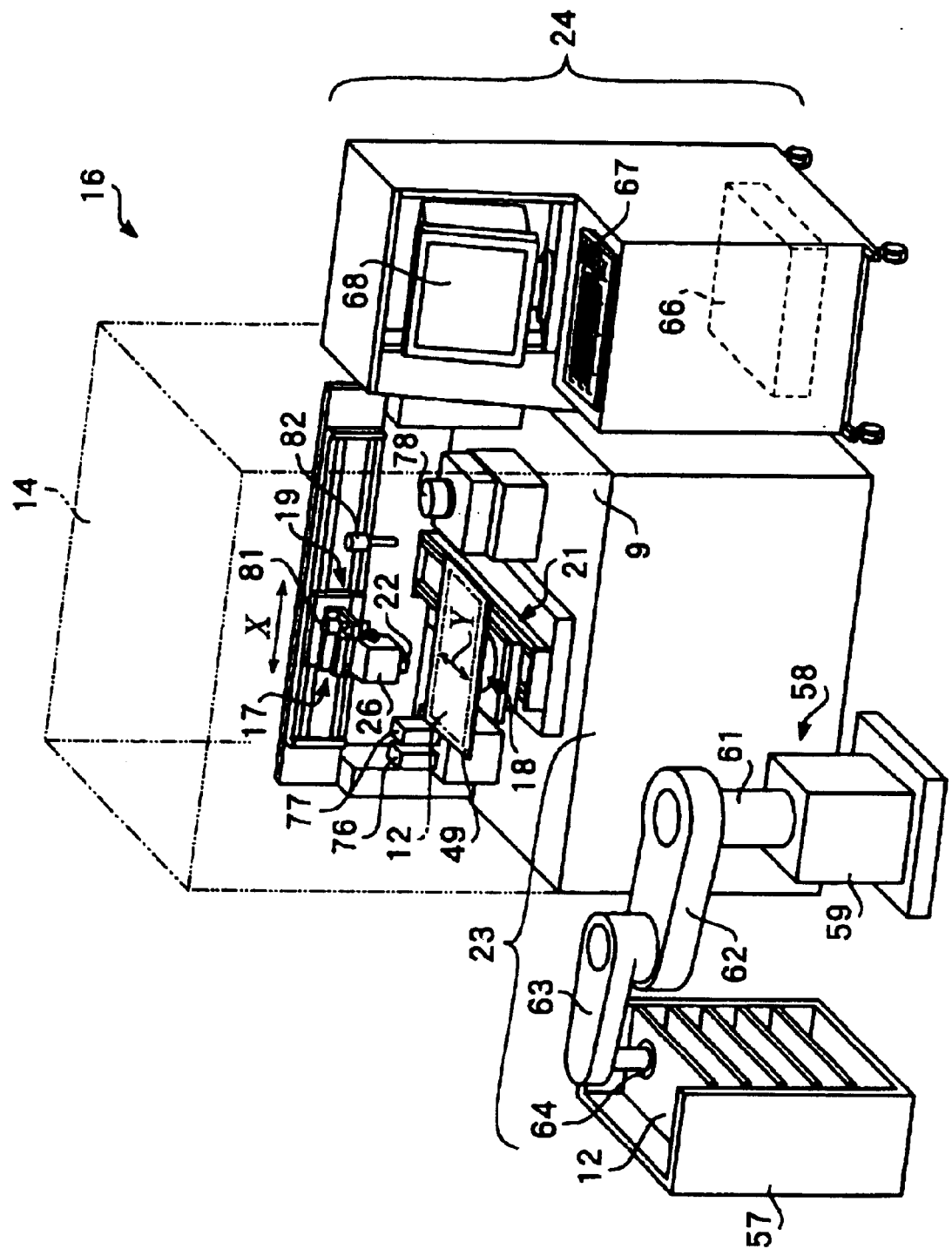
FIG. 5 is a perspective view of an ink-jet apparatus used in one manufacturing step shown in FIG. 4 in an embodiment of the present invention.

FIG. 5 shows an example of ink-jet apparatuses. The color pixel formation step P3 and the protective layer formation step P5 shown in FIG. 4 can be performed using an ink-jet apparatus 16 shown in FIG. 5. The ink-jet apparatus 16 is used for ejecting color pixel materials or a protective layer material as ink droplets so as to deposit the ink droplets at predetermined positions in the individual color-filter-forming regions 11 in the mother substrate 12 (see FIG. 2(b)).

As shown in FIG. 5, the ink-jet apparatus 16 includes a head unit 26 provided with an ink-jet head 22, a head position control unit 17 for controlling the position of the ink-jet head 22, a substrate position control unit 18 for controlling the position of a mother substrate 12, a main scanning drive unit 19 for moving the ink-jet head 22 to scan the mother substrate 12, a subscanning drive unit 21 for moving the ink-jet head 22 to subscan the mother substrate 12, a substrate feeder 23 for feeding the mother substrate 12 to a predetermined zone in the ink-jet apparatus 16, and a control unit 24 for performing overall control on the ink-jet apparatus.

The head position control unit 17, the substrate position control unit 18, the main scanning drive unit 19, and the subscanning drive unit 21 are placed on a base 9. These units are covered with a cover 14 as necessary.

As shown in FIG. 7(a), the ink-jet head 22 includes a plurality of head sections 20 (e.g., six head sections in FIG. 7(a)) and a carriage 25 as a support which aligns and supports the head sections 20. The carriage 25 has holes, i.e., recesses, at positions for supporting the head sections 20, each hole being slightly larger than the head section 20, and the individual head sections 20 are fitted into the holes and fixed with screws, an adhesive, or other fastening means. When the head sections 20 can be accurately positioned on the carriage 25, the head sections 20 may be fixed by press fitting without using a special fastening means.

As shown in FIG. 7(b), the head section 20 has a nozzle row 28 in which a plurality of nozzles 27 are aligned. The number of nozzles 27 is, for example, 180, the hole diameter of the nozzle 27 is, for example, 28 mm, and the nozzle pitch between the nozzles 27 is, for example, 141 mm. In FIGS. 2(a) and 2(b), the X direction is the main scanning direction with respect to the base member 2 and the mother substrate 12, and the Y direction orthogonal thereto is the subscanning direction. In FIG. 7(a), the X direction and the Y direction are indicated by arrows relative to the ink-jet head 22.

The ink-jet head 22 performs main scanning on the mother substrate 12 by parallel translation in the X direction. During main scanning, color pixel materials or the protective layer material are selectively ejected as inks from the plurality of nozzles 27 in the individual head sections 20, and thereby the color pixel materials or the protective layer material are deposited at the predetermined positions in the mother substrate 12. The main scanning position by the ink-jet head 22 can be shifted by a predetermined distance by translating the ink-jet head 22 in the subscanning direction Y, for example, by a length L2, which is a length of one nozzle row 28, or an integral multiple thereof.

The nozzle rows 28 in the individual head sections 20 are placed so as to be aligned on a straight line Z when the individual head sections 20 are fitted into the carriage 25. The distance D between two adjacent head sections 20 is set so that the distance between the nozzles 27 located at the ends in the two adjacent head sections 20 is equal to the length L2 of the nozzle row 28 in each head section 20. The nozzle rows 28 are placed as described above in order to facilitate the main scanning control in the X direction and the subscanning control in the Y direction with respect to the ink-jet head 22, and the arrangement of the nozzle rows 28, i.e., the arrangement of the head sections 20 relative to the carriage 25, may be selected in any manner other than the above.

As shown in FIGS. 8(a) and 8(b), each head section 20 includes, for example, a nozzle plate 29 composed of stainless steel, a vibrating plate 31 opposed thereto, and a plurality of partitioning members 32 joining these plates therethrough. A plurality of ink chambers 33 and a liquid pool 34 are formed by the partitioning members 32 between the nozzle plate 29 and the vibrating plate 31. The plurality of ink chambers 33 communicate with the liquid pool 34 via passages 38.

An ink feed port 36 is formed at an appropriate position of the vibrating plate 31, and an ink feeder 37 is connected to the ink feed port 36. The ink feeder 37 feeds a material M for the color pixels or a material M for the protective layer into the ink feed port 36. The fed material M for the color pixels or material M for the protective layer fills the liquid pool 34, passes through the passages 38, and fills the ink chambers 33. With respect to the material M for the color pixels, any one of colors R (red), G (green), and B (blue) is fed from the ink feeder 37, and a separate head section 20 is prepared for each color.

The nozzle plate 29 is provided with the nozzles 27 for jetting the material M for the color pixels or the material M for the protective layer from the ink chambers 33. Pressure-applying units 39 for applying pressure to the ink are mounted corresponding to the ink chambers 33 on the surface of the vibrating plate 31 opposite to the surface where the ink chambers 33 are formed. Each pressure-applying unit 39 includes a piezoelectric element 41 and a pair of electrodes 42*a* and 42*b* sandwiching the piezoelectric element 41. The piezoelectric element 41 deflects so as to protrude outside in the direction indicated by the arrow C when current is applied to the electrodes 42*a* and 42*b*, and thereby the volume of the ink chamber 33 is increased. As a result, the material M for the color pixels or the material M for the protective layer, in an amount corresponding to the increase in the volume of the ink chamber 33, flows from the liquid pool 34 into the ink chamber 33 via passages 38.

When the applied current to the piezoelectric element 41 is turned off, the piezoelectric element 41 and the vibrating plate 31 regain their original shapes. Thereby, the volume of the ink chamber 33 also returns to the original volume, and as a result, the pressure of the material M for the color pixels or the material M for the protective layer in the ink chamber 33 is increased, and the material M for the color pixels or the material M for the protective layer is ejected as droplets 8 and 10 from the nozzle 27 toward the mother substrate 12 (see FIG. 2(*b*)). Additionally, an ink-repellent layer 43, for example, composed of a Ni-tetrafluoroethylene eutectoid plating layer, is formed in the periphery of the nozzle 27 in order to prevent warping of ejected droplets 8 and 10 and clogging of the nozzle 27.

Figure 6:
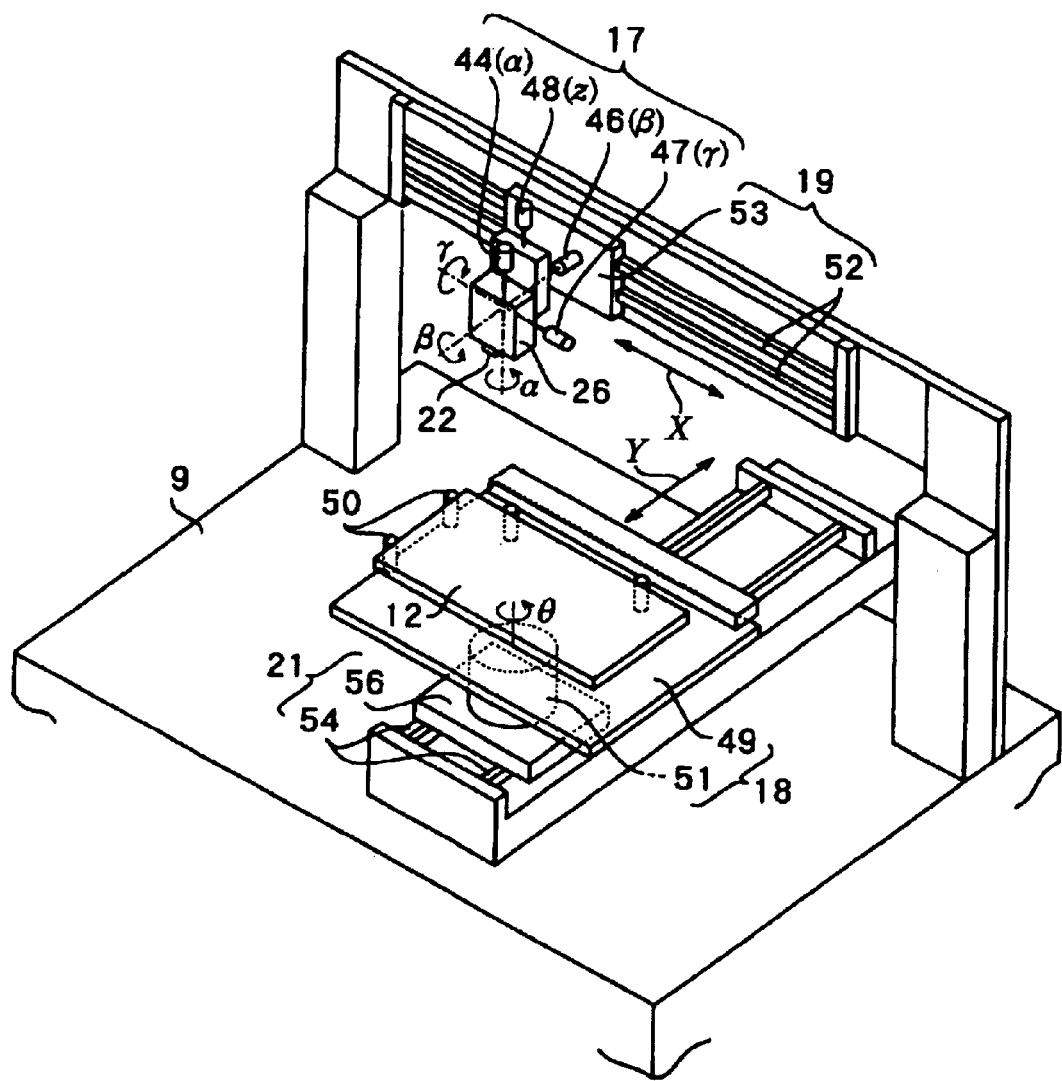
FIG. 6 is an enlarged perspective view showing a major part of the apparatus shown in FIG. 5.

The head position control unit 17 shown in FIG. 5 includes, as shown in FIG. 6, an a motor 44 for rotating the ink-jet head 22 in-plane, a b motor 46 for oscillating and rotating the ink-jet head 22 upon the axis which is parallel to the subscanning direction Y, a g motor 47 for oscillating and rotating the ink-jet head 22 upon the axis which is parallel to the main scanning direction X, and a Z motor 48 for translating the ink-jet head 22 vertically.

The substrate position control unit 18 shown in FIG. 5 includes, as shown in FIG. 6, a table 49 for placing the mother substrate 12 and a q motor 51 for rotating the table 49 in-plane as indicated by the arrow q. The main scanning drive unit 19 shown in FIG. 5 includes, as shown in FIG. 6, guide rails 52 extending in the main scanning direction X and a slider 53 having a built-in linear motor which is pulse-driven. The slider 53 is translated in the main scanning direction X along the guide rails 52 when the built-in linear motor is driven.

The subscanning drive unit 21 shown in FIG. 5 includes, as shown in FIG. 6, guide rails 54 extending in the subscanning direction Y and a slider 56 having a built-in linear motor which is pulse-driven. The slider 56 is translated in the subscanning direction Y along the guide rails 54 when the built-in linear motor is driven.

The linear motor, which is pulse-driven in the slider 53 or the slider 56, can precisely control the rotation angle of the output shaft by pulse signals supplied to the motor. Therefore, it is possible to control with high precision the position of the ink-jet head 22 supported by the slider 53 in the main scanning direction X, the position of the table 49 in the subscanning direction Y, etc.

Additionally, the position control of the ink-jet head 22 and the table 49 is not limited to the position control method using the pulse motor, and feedback control using a servomotor, or any other control method may be employed.

The substrate feeder 23 shown in FIG. 5 includes a substrate receiving unit 57 for storing mother substrates 12, and a robot 58 for transporting the mother substrates 12. The robot 58 includes a base 59 to be placed on an installation plane such as the floor and the ground, an elevating axis 61 which vertically moves relative to the base 59, a first arm 62 which rotates about the elevating axis 61, a second arm 63 which rotates relative to the first arm 62, and a suction pad 64 provided on the lower surface of the tip of the second arm 63. The suction pad 64 holds the mother substrate 12 by suction, such as air suction.

With reference to FIG. 5, a capping unit 76 and a cleaning unit 77 are disposed on one side of the subscanning drive unit 21 and in the path of the ink-jet head 22 which performs main scanning movement driven by the main scanning drive unit 19. An electronic balance 78 is disposed on the other side. The cleaning unit 77 cleans the ink-jet head 22. The electronic balance 78 measures the weight of ink droplets ejected from the nozzles 27 in the ink-jet head 22 for each nozzle. The capping unit 76 prevents the nozzles 27 from being dried when the ink-jet head 22 is on standby.

A camera 81 for the head is placed in the vicinity of the ink-jet head 22 so as to move together with the ink-jet head 22. A camera 82 for the substrate, which is supported by a supporting unit (not shown in the drawing) provided on the base 9, is placed at a position which allows the mother substrates 12 to be photographed.

The control unit 24 shown in FIG. 5 includes a computer main unit 66 containing a processor, a keyboard 67 as an input device, and a CRT (Cathode Ray Tube) display 68 as a display device. The processor includes, as shown in FIG. 9, a CPU (Central Processing Unit) 69 which performs processing and a memory 71, i.e., information storage medium, which stores various types of information.

Figure 9:
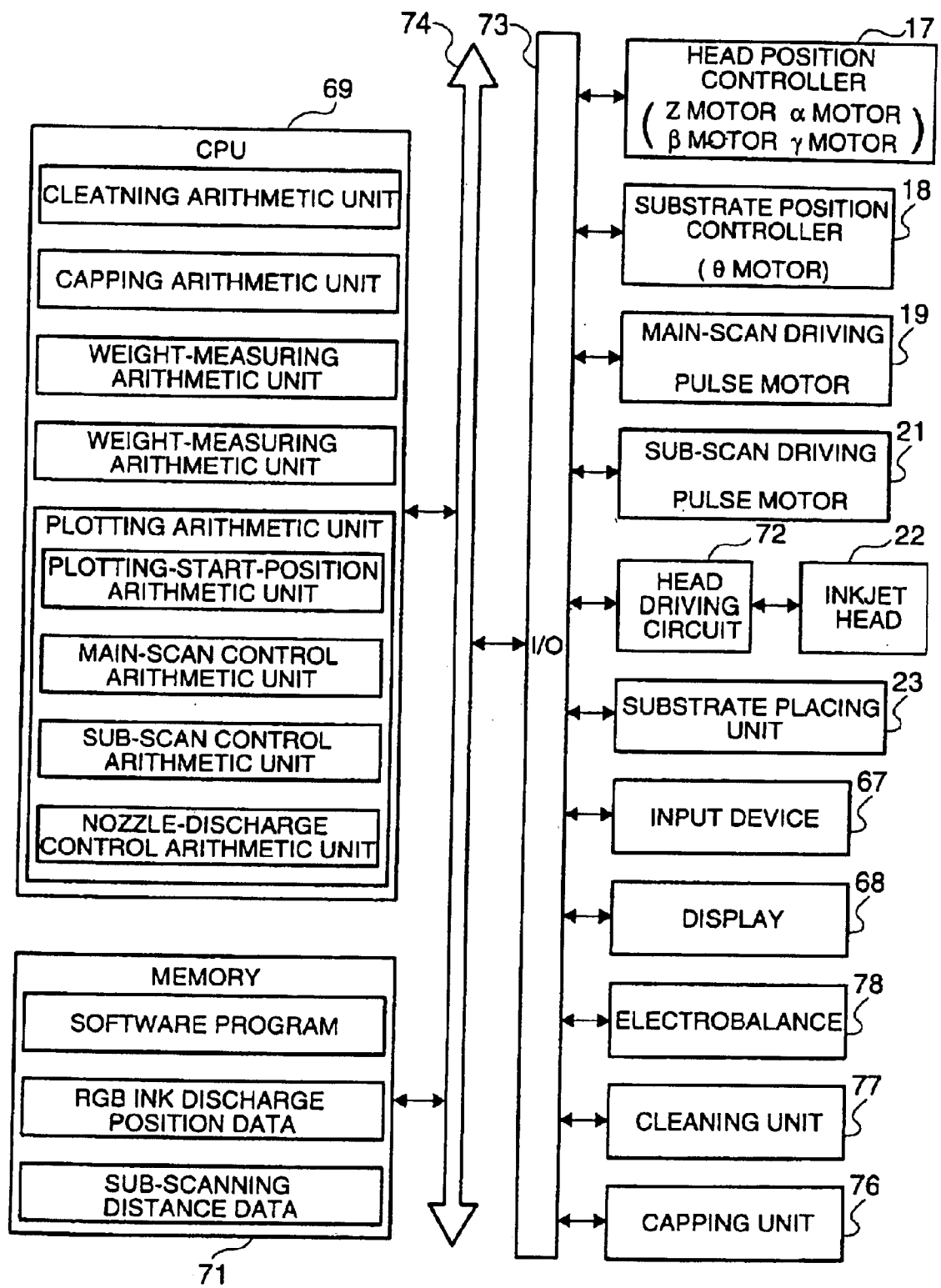
FIG. 9 is a block diagram showing the electric control system used in the ink-jet apparatus shown in FIG. 5.

The head position control unit 17, the substrate position control unit 18, the main scanning drive unit 19, the subscanning drive unit 21 shown in FIG. 5, and a head drive circuit 72 for driving the piezoelectric element 41 in the ink-jet head 22 (see FIG. 8(*b*)) are connected to the CPU 69 via an input/output interface 73 and a bus 74, as shown in FIG. 9.

The substrate feeder 23, the input device 67, the display 68, the electronic balance 78, the cleaning unit 77, and the capping unit 76 are also connected to the CPU 69 via the input/output interface 73 and the bus 74.

The memory 71 may include semiconductor memories, such as RAM (Random Access Memory) and ROM (Read Only Memory), and external memory units, such as hard disks, CD-ROM readers, and disk recording media. In the memory 71, various storage areas are functionally set, for example, a storage area that stores a software program in which the control procedure for the operation of the ink-jet apparatus 16 is described, a storage area for storing the amount of main scanning movement of the slider 53 in the main scanning direction X and the amount of subscanning movement of the mother substrate 12 in the sumscanning direction Y shown in FIG. 6, a work area for the CPU 69, and an area which acts as a temporary file.

In the method for manufacturing the color filter substrate shown in FIG. 4, the ink-jet apparatus 16 shown in FIG. 5 can be used in both the color pixel formation step P3 and the protective layer formation step P5 shown in FIG. 5. Devices with substantially the same mechanism may be applied as the ink-jet apparatuses 16 used in these steps.

In the memory 71 shown in FIG. 9 provided in the ink-jet apparatus 16 used in the color pixel formation step P3, a software program for controlling the overall procedure of the color pixel formation, R (red), G (green), and B (blue) forming position data for achieving the desired color pixel arrangement shown in FIG. 3, and R (red), G (green), and B (blue) deposition amount data for defining the amount of individual coloring materials supplied to the individual positions for R (red), G (green), and B (blue) are stored. The R (red), G (green), and B (blue) deposition amount data may be defined by color or may be defined in relation with the coordinate locations on the mother substrate 12.

The CPU 69 for the ink-jet apparatus 16 for the color pixel formation calculates which nozzle 27 among a plurality of nozzles 27 and which timing should be for ejecting ink (i.e., the materials for the color pixels) during the main scanning of the ink-jet head 22 based on the R (red), G (green), and B (blue) forming position data and the R (red), G (green), and B (blue) deposition amount data.

In the memory 71 shown in FIG. 9 that is provided in the ink-jet apparatus 16 used in the protective layer formation step P5, a software program for controlling the overall procedure of the protective layer formation, R (red), G (green), and B (blue) forming position data for achieving the desired color pixel arrangement shown in FIG. 3, and R (red), G (green), and B (blue) deposition amount data for defining the amount of individual coloring materials supplied to the individual positions for R (red), G (green), and B (blue) are stored as with the case of the ink-jet apparatus 16 used in the color pixel formation step P3.

The CPU 69 for the ink-jet apparatus 16 for the protective layer formation calculates which nozzle 27 among a plurality of nozzles 27 and which timing should be for ejecting ink (i.e., the materials for the color pixels) during the main scanning of the ink-jet head 22 based on the R (red), G (green), and B (blue) forming position data and the R (red), G (green), and B (blue) deposition amount data.

As the memory 71 for the ink-jet apparatus 16 for the protective layer formation, instead of storing the R (red), G (green), and B (blue) deposition amount data, the amount of the protective layer material that should be ejected specifically corresponding to the individual color pixels of R (red), G (green), and B (blue) may be directly stored.

The CPU 69 shown in FIG. 9 controls the ejection of ink or the protective layer material to the predetermined position on the surface of the mother substrate 12 in accordance with the software program stored in the memory 71. The CPU 69 includes, as specific functional parts, a cleaning operation part for performing processing in order to achieve cleaning treatment, a capping operation part for achieving capping treatment, a weight measurement operation part for calculating in order to measure weight using the electronic balance 78 (see FIG. 5), and a drawing operation part for calculating in order to draw using the color pixel material or the protective layer material by ink-jetting.

The drawing operation part includes various functional parts, such as a drawing starting position operation part for setting the ink-jet head 22 to the initial position for drawing, a main scanning control operation part for calculating the control for scanning and moving the ink-jet head 22 in the main scanning direction X at a predetermined speed rate, a subscanning control operation part calculating the control for shifting the mother substrate 12 in the subscanning direction Y by the predetermined subscanning amount, and a nozzle ejection control operation part for calculating which nozzle 27 among a plurality of nozzles 27 and which timing should be for ejecting ink or the material for the protective layer.

Although the case in which the individual functions are performed in accordance with the software using the CPU 69 is described above, when the individual functions can be performed by separate electronic circuits without using a CPU, such electronic circuits may be used.

The operation of the ink-jet apparatus 16 having the construction described above will now be described based on the flowchart shown in FIG. 10.

When the ink-jet apparatus 16 is brought into operation by turning on of power by the operator, first, initial setting is performed in step S1. Specifically, the head unit 26, the substrate feeder 23, the control unit 24, etc., are set in the predetermined initial state.

Next, when weight measurement timing arrives (YES in step S2), the unit head 26 shown in FIG. 6 is moved to the electronic balance 78 shown in FIG. 5 by the main scanning drive unit 19 (step S3), and the amount of ink ejected from the nozzle 27 is measured using the electronic balance 78 (step S4). The voltage to be applied to the piezoelectric element 41 corresponding to the desired amount of ejection is adjusted according to the ink ejection characteristics of the head 22 (step S5).

Next, when cleaning timing arrives (YES in step S6), the head unit 26 is moved to the cleaning unit 77 by the main scanning drive unit 19 (step S7), and the ink-jet head 22 is cleaned by the cleaning unit 77 (step S8).

When weight measurement timing and cleaning timing do not arrive (NO in step S2 and step S6), or when such timing is dealt with, the substrate feeder 23 shown in FIG. 5 is put into operation to feed the mother substrate 12 onto the table 49 in step S9. Specifically, the mother substrate 12 in the substrate receiving unit 57 is held by suction using the suction pad 64, the mother substrate 12 is then transported to the table 49 by moving the elevating axis 61, the first arm 62, and the second arm 63, and the mother substrate 12 is pressed against the locating pins 50 (see FIG. 6) which are preliminarily provided on the table 49. Additionally, in order to prevent the mother substrate 12 from being misaligned on the table 49, preferably, the mother substrate 12 is fixed on the table 49 by air suction or the like.

Figure 11:
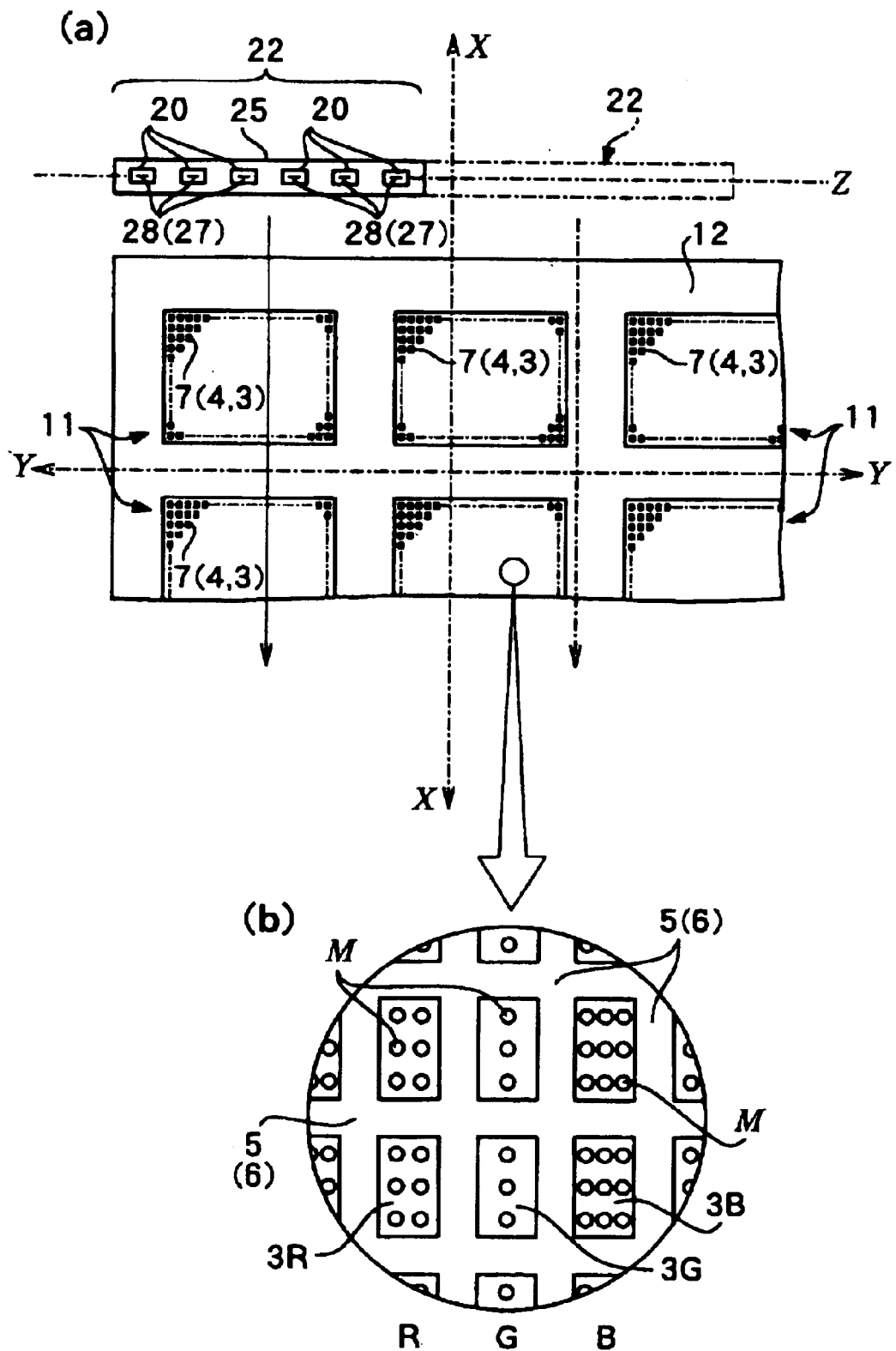
FIGS. 11(a) and 11(b) are plan views which schematically show the major step in the method for manufacturing the color filter substrate in an embodiment of the present invention.

Next, while observing the mother substrate 12 by the camera 82 for the substrate shown in FIG. 5, the table 49 is rotated in-plane by microangle to position the mother substrate 12 by rotating the output axis of the q motor 51 by microangle shown in FIG. 6 (step S10). Next, while observing the mother substrate 12 by the camera 81 for the head shown in FIG. 5, the drawing starting position for the ink-jet head 22 is determined by calculation (step S11), and the ink-jet head 22 is moved to the drawing starting position by putting the main scanning drive unit 19 and the subscanning drive unit 21 into operation appropriately (step S12). At this stage, as shown in FIG. 11, the ink-jet head 22 is set so that the extending direction Z of the nozzle rows 28 of the individual head sections 20 are perpendicular to the main scanning direction X.

Figure 10:
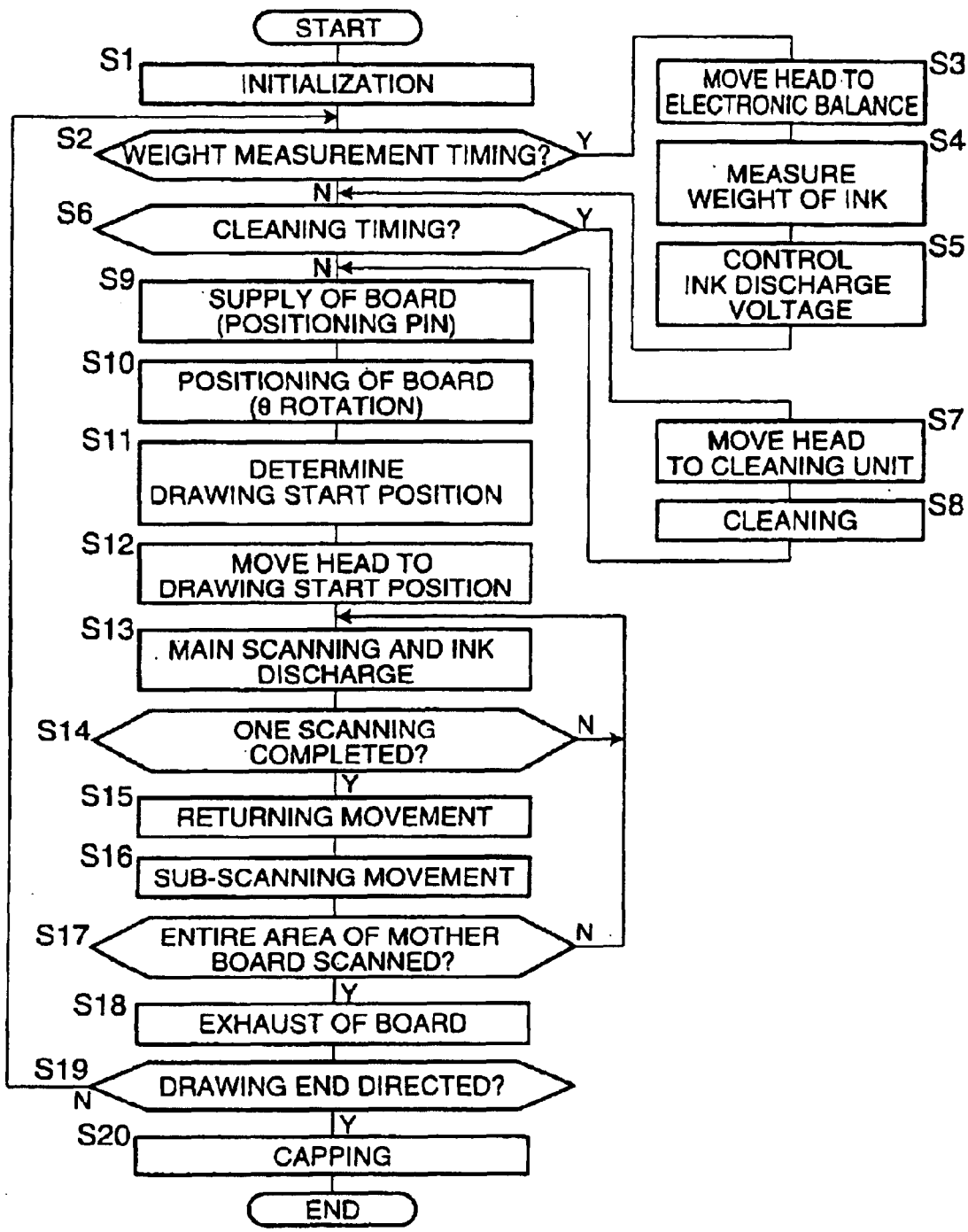
FIG. 10 is a flowchart showing the control flow executed by the system shown in FIG. 9.

When the ink-jet head 22 is placed at the drawing starting position in step S12 shown in FIG. 10, main scanning in the X direction starts in step 13, and simultaneously, ink ejection starts. Specifically, the main scanning drive unit 19 shown in FIG. 6 is put into operation and the ink-jet head 22 scans and moves linearly at a constant speed rate in the main scanning direction X shown in FIG. 11. During the movement, when the nozzle 27 reaches the regions onto which the material for the color pixel or the material for the protective layer is to be ejected, ink, i.e., the material for the color pixel or the material for the protective layer, is ejected from the nozzle 27 and the region is filled in.

For example, in the color pixel formation step P3 shown in FIG. 4, the individual color pixels are formed using ink-jet apparatuses 16 corresponding to the individual colors in the ejection amounts that satisfy the relationship $V_G > V_R > V_B \ldots$ (1), wherein $V_R$ is the ejection amount of the R color pixel 3R, $V_G$ is the ejection amount of the G color pixel 3G, and $V_B$ is the ejection amount of the B color pixel 3B shown in FIG. 1.

Next, in the wettability improvement step P4 shown in FIG. 4, treatment for improving wettability is performed. Specifically, the wettability improvement processor 300 is put into operation, and the delimiting member 5 is irradiated with the treating material, such as oxygen gas or UV light, and thus the wettability of the delimiting member 5 is improved.

After the wettability improvement step P4 is performed, the protective layer 4 is formed using an ink-jet apparatus 16 in the ejection amount so as to satisfy the relationship, ejection amount of protective layer material for B>ejection amount of protective layer material R>ejection amount of protective layer material for G, assuming that the individual color pixels 3 are formed in the state to satisfy the relationship (1) as shown in FIG. 1 in the protective layer formation step P5. FIG. 11(b) shows the state in which dots of the material M for the protective layer are ejected in the amounts suitable for the amounts of the individual color pixels 3R, 3G, and 3B so as to satisfy the relationship (2).

Referring to FIG. 11(a), when the ink-jet head 22 completes one main scanning operation toward the mother substrate 12 (YES in step S14), the ink-jet head 22 reverses and returns to the initial position (step S15). The ink-jet head 22 is then driven by the subscanning drive unit 21 and moves in the subscanning direction Y by a predetermined subscanning amount, for example, a length of one nozzle row 28 belonging to a head section 20, or an integral multiple thereof (step S16). Next, main scanning and ink ejection are repeated, and the color pixels 3 or the protective layer 4 are formed in the region not yet provided with the color pixels 3 or the protective layer 4 (step S13).

When the drawing operation for the color pixels 3 or the protective layer 4 by the ink-jet head 22 as described above is completed over the entire region of the mother substrate 12 (YES in step S17), the processed mother substrate 12 is discharged by the substrate feeder 23 or any other transporting device in step S18. Unless process termination is directed by the operator (NO in step S19), the work returns to step S2 and ejection operation of the protective layer to another mother substrate 12 is repeated.

When process termination is directed by the operator (YES in step S19), the CPU 69 transports the ink-jet head 22 to the capping unit 76 shown in FIG. 5, and capping is performed on the ink-jet head 22 by the capping unit 76 (step S20).

Patterning of the individual color pixels 3 or the protective layer 4 constituting the color filter substrate 1 is completed as described above. When patterning of the protective layer 4 is completed, a mother substrate 12 in which a plurality of color filter substrates 1 (FIG. 2(a)) having a desired dot arrangement of R (red), G (green), and B (blue), such as a stripe arrangement, is produced.

Additionally, when the color filter substrate 1 thus obtained is used for color display in a liquid crystal display device, electrodes and alignment films, etc., are deposited on the surface of the color filter substrate 1. In such a case, if the individual color filter substrates are separated by cutting the mother substrate 12 before the electrodes and the alignment films are deposited, the formation step of the electrodes, etc., becomes significantly complex. Therefore, instead of cutting the mother substrate 12 immediately after the color filter substrates 1 are completed on the mother substrate 12, preferably, the mother substrate 12 is cut after the necessary additional steps, such as formation of electrodes and formation of alignment films, are completed.

Figure 12:
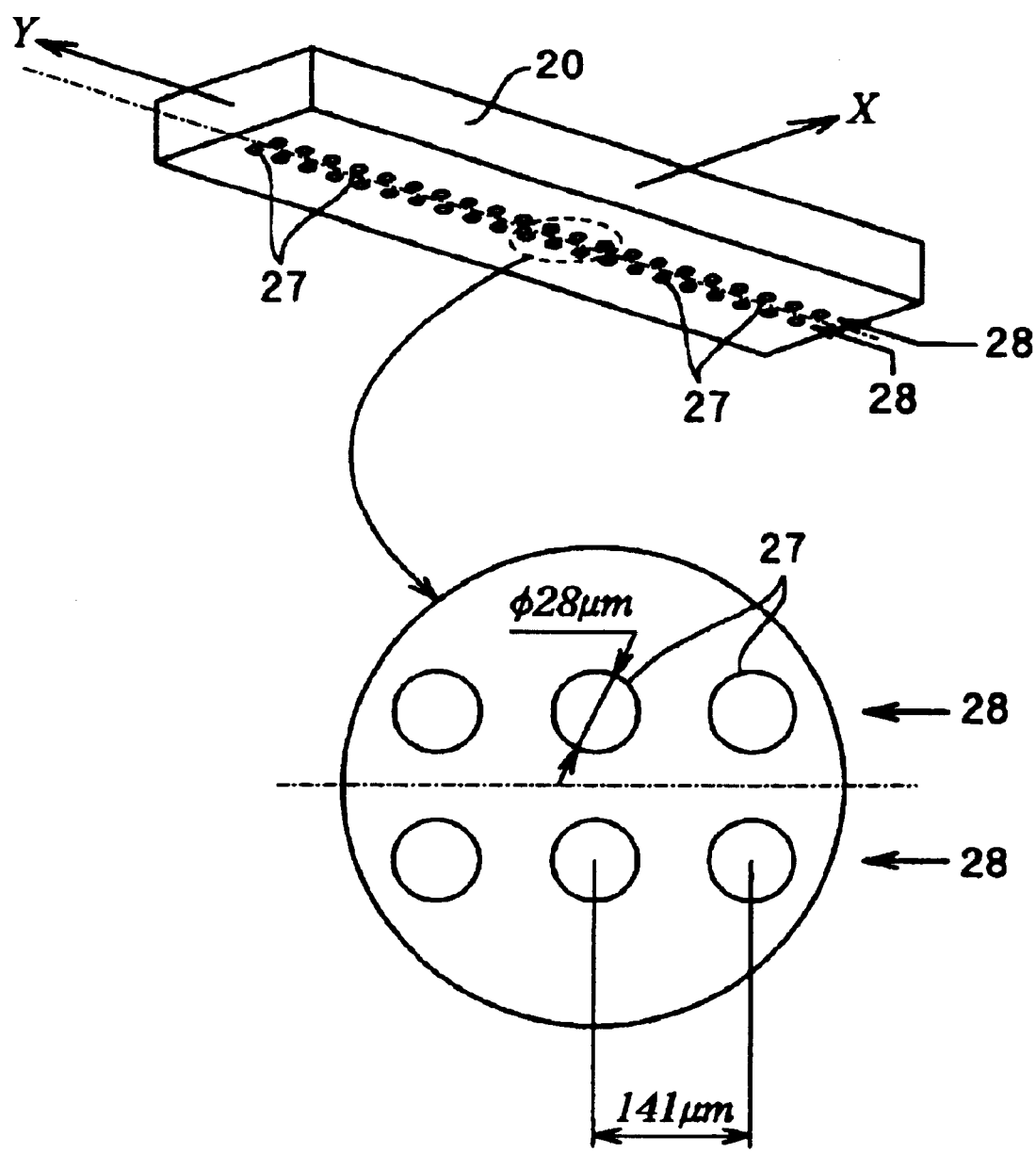
FIG. 12 is a perspective view showing a modified example of the head section of an ink-jet head.

FIG. 12 shows a modification of the head section 20 shown in FIG. 7(b). In the head section 20 shown in FIG. 7(b), one nozzle row 28 is provided in the main scanning direction X. Instead of this, in the head section 20 shown in FIG. 12, a plurality of rows of nozzle rows 28, two rows in this embodiment, are provided in the main scanning direction X. By using the head section 20, when the carriage 25 shown in FIG. 7(a) performs main scanning in the X direction, since two nozzles 27 aligned in the main scanning direction X can eject ink, it is possible to diversify the method for controlling the ejection amount of the material for the color pixel and the material for the protective layer.

Figure 13:
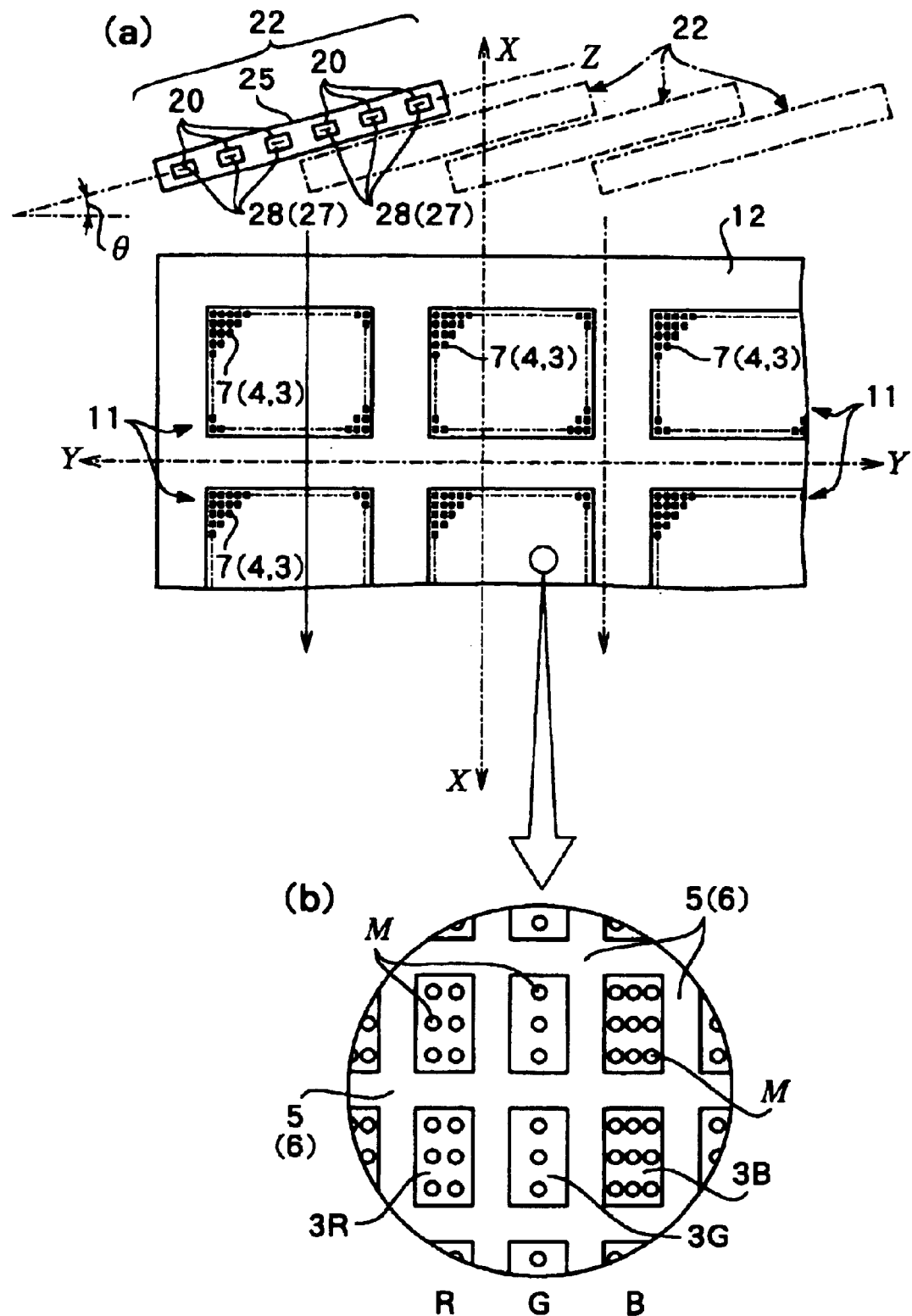
FIGS. 13(a) and 13(b) are plan views which schematically show the major step in the method for manufacturing the color filter substrate in another embodiment of the present invention.

FIG. 13 shows the major step of a method for manufacturing a color filter substrate in another embodiment of the present invention, which is performed instead of the step shown in FIG. 11 in the previous embodiment. The color filter substrate manufactured by the method in this embodiment can be the color filter substrate 1 shown in FIG. 1. The color filter substrate 1 can be manufactured by cutting the mother substrate 12 shown in FIG. 2(b).

The color pixels formed on the color filer substrate 1 may be arranged in various patterns, such as the stripe pattern shown in FIG. 3. The steps P1 to P5 shown in FIG. 4 may be employed as the steps for manufacturing the color filter substrate 1. The ink-jet apparatus shown in FIG. 5 may be employed as the ink-jet apparatus used in the color pixel formation step P3 and the protective layer formation step P5.

In the protective layer formation step P5 shown in FIG. 4, instead of the ink-jet apparatus shown in FIG. 5, a film forming method, such as spin-coating, may be used.

The embodiment shown in FIG. 13 differs from the embodiment shown in FIG. 11 in that, when the ink-jet head 22 is placed at the initial position with respect to the mother substrate 12, i.e., at the main scanning start position, the entire carriage 25 is inclined to the subscanning direction Y at an angle q, and thereby the extending direction Z of six nozzle rows 28 is inclined to the subscanning direction Y at an angle q.

In such a construction, since the individual head sections 20 performs main scanning in the X direction while being inclined to the subscanning direction Y at an angle q, it is possible to make the pitch between the nozzles 27 belonging to each head section 20 agree with the distance between the color-pixel-forming regions and the distance between the protective layer-forming regions on the mother substrate 12, i.e., the pitch between elements. If the pitch between nozzles and the pitch between elements agree with each other geometrically, it is not necessary to control the position of the nozzle row 28 with respect to the subscanning direction Y, which is desirable.

Figure 14:
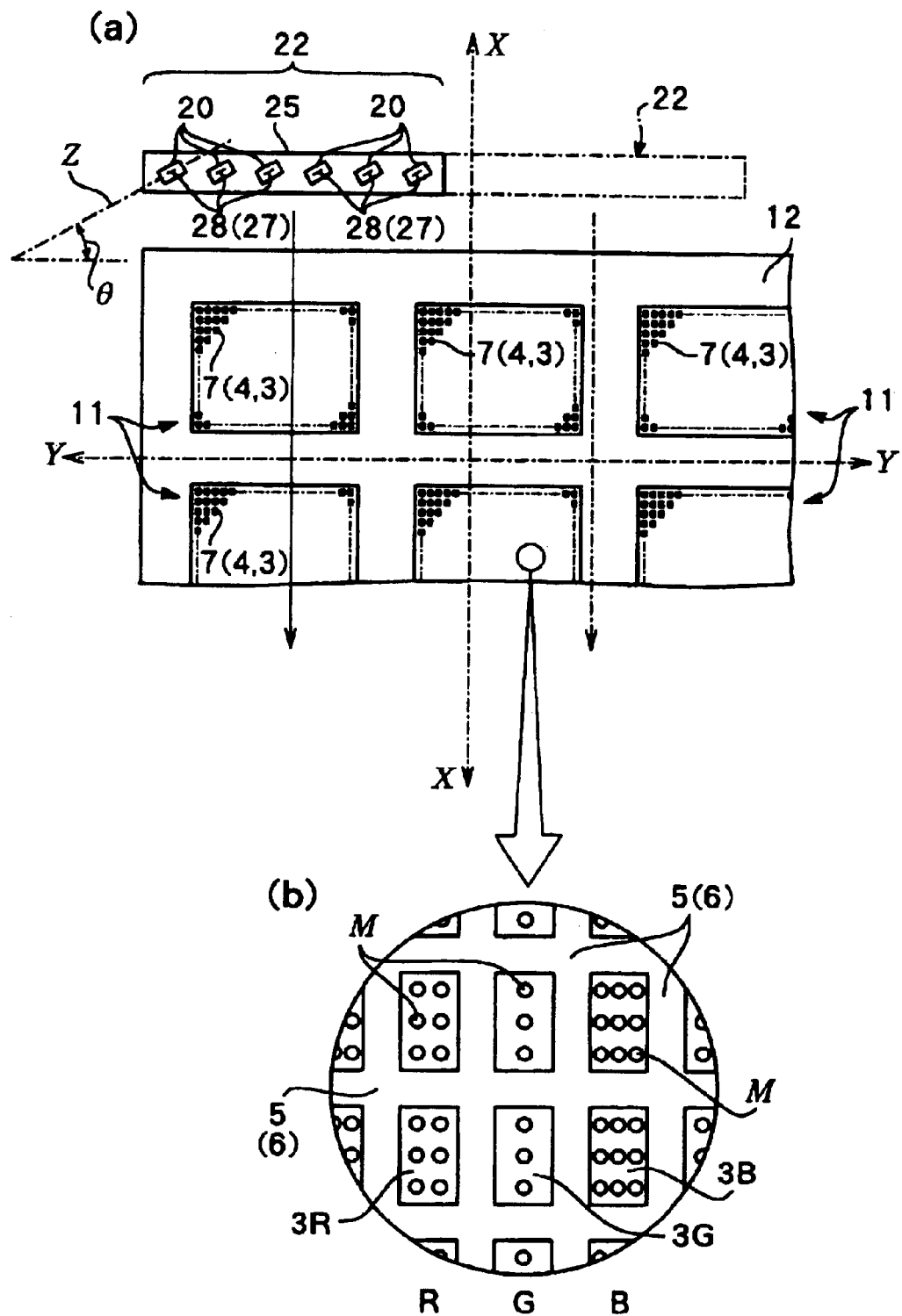
FIGS. 14(a) and 14(b) are plan views which schematically show the major step in the method for manufacturing the color filter substrate in another embodiment of the present invention.

FIG. 14 shows the major step of a method for manufacturing a color filter substrate in another embodiment of the present invention, which is performed instead of the step shown in FIG. 11 in the previous embodiment. The color filter substrate manufactured by the method in this embodiment can be the color filter substrate 1 shown in FIG. 1. The color filter substrate 1 can be manufactured by cutting the mother substrate 12 shown in FIG. 2(b).

The color pixels formed on the color filer substrate 1 may be arranged in various patterns, such as the stripe pattern shown in FIG. 3. The steps P1 to P5 shown in FIG. 4 may be employed as the steps for manufacturing the color filter substrate 1. The ink-jet apparatus shown in FIG. 5 may be employed as the ink-jet apparatus used in the color pixel formation step P3 and the protective layer formation step P5.

In the protective layer formation step P5, instead of the ink-jet apparatus shown in FIG. 5, a film forming method, such as spin-coating, may be used.

The embodiment shown in FIG. 14 differs from the embodiment shown in FIG. 11 in that, when the ink-jet head 22 is placed at the initial position with respect to the mother substrate 12, i.e., at the main scanning start position, although the entire carriage 25 is not inclined to the subscanning direction Y, since six head sections 20 individually are inclined to the subscanning direction Y at an angle q, the extending direction Z of each nozzle row 28 is inclined to the subscanning direction Y at an angle q.

In such a construction, since the individual nozzle rows 28 perform main scanning in the X direction while being inclined to the subscanning direction Y at an angle q, it is possible to make the pitch between the nozzles 27 belonging to each nozzle row 28 agree with the distance between the color-pixel-forming regions and the distance between the protective layer-forming regions, i.e., the pitch between elements. If the pitch between nozzles and the pitch between elements agree with each other geometrically, it is not necessary to control the position of the nozzle row 28 with respect to the subscanning direction Y, which is desirable.

Additionally, since the individual head sections 20 are inclined instead of inclining the entire carriage 25 as shown in FIG. 13, it is possible to significantly decrease the distance, in comparison with the case in FIG. 13, between the nozzle 27 that is closest to the mother substrate 12 to which ejection is performed, and the nozzle 27 that is farthest from the mother substrate 12. Therefore, it is possible to reduce time for main scanning in the X direction. As a result, it is possible reduce time for manufacturing the color filter substrate.

A liquid crystal display device in an embodiment of the present invention will be described below with reference to FIG. 15. Additionally, the liquid crystal display device is an example of electro-optical devices and uses a liquid crystal as the electro-optical substance.

First, the overall structure of a liquid crystal display device 101 shown in FIG. 15 will be described. The liquid crystal display device 101 includes the color filter substrate 1 shown in FIG. 1, and the color filter substrate 1 includes the base member 2, the delimiting member 5 formed at a predetermined height on the base member 2 so as to delimit color-pixel-forming regions 7 having a predetermined pattern on the surface of the base member 2, color pixels 3 formed in the color-pixel-forming regions 7 on the surface of the base member 2 by applying liquid materials for the color pixels, and the protective layer 4 formed on the surfaces of the color pixels 3 by applying a liquid material for the protective layer.

The liquid crystal display device 101 further includes pixel electrodes (i.e., second electrodes) 114b formed on the color filter substrate 1 (i.e., second substrate 107b), a substrate (i.e., first substrate) 107a which is opposed to the color filter substrate 1 (i.e., second substrate 107b) to form a pair of substrates, first electrodes 114a being formed on the first substrate 1 so as to face the second electrodes 114b, and a liquid crystal sandwiched and sealed between the pair of the substrate 1 (i.e., second substrate 107b) and the substrate 107a, i.e., between the electrodes 114a and 114b.

In the liquid crystal display device 101, the delimiting member 5 of the color filter substrate 1 is composed of a resin having repellency to the materials for the color pixels and to the material for the protective layer, and the surface of the delimiting member 5 is subjected to surface treatment to decrease the repellency to the liquid material for the protective layer 4.

As preferred embodiments are the following features for which the same structures as those described above may be employed.

(1) As the delimiting member, a material including a fluorocarbon resin or a silicone resin is used, and in particular, a material having a contact angle of 25° or more with respect to the materials for the color pixels can be used.

(2) As the protective layer, a material including at least one resin selected from the group consisting of acrylic resins, epoxy resins, imide resins, and fluorocarbon resins can be used.

(3) The surface treatment can be performed by oxygen (O2) plasma ashing, atmospheric plasma ashing, or UV ashing.

(4) The oxygen (O2) plasma ashing, atmospheric plasma ashing, or UV ashing can be performed under the conditions described above.

(5) A light-shielding layer (i.e., black mask) can be formed in a predetermined pattern on the surface of the base member, and the delimiting member can be formed on the surface of the light-shielding layer.

(6) The delimiting member can be formed so as to have a light-shielding effect and to function as a black mask as well.

(7) The color pixels are formed in the color-pixel-forming regions on the surface of the base member by ejecting droplets of materials for the color pixels.

Preferably, the liquid crystal is either a STN (Super Twisted Nematic) liquid crystal or a TN (Twisted Nematic) liquid crystal. Since the liquid crystal display device using the STN liquid crystal or the TN liquid crystal performs a display making use of birefringence of the liquid crystal, the thickness of the liquid crystal layer must be uniform over the entire surface of the display region. Therefore, the present invention ensures the flatness of the portion of the color filter substrate and is employed particularly effectively when the STN liquid crystal or the TN liquid crystal is used.

The liquid crystal display device 101 in this embodiment will now be described in more detail with reference to FIGS. 15 and 16. FIG. 16 is a sectional view of the liquid crystal display device 101 taken along the line X—X of FIG. 15. The liquid crystal display device 101 is a transflective liquid crystal display which performs a full color display by a simple matrix method.

Figure 15:
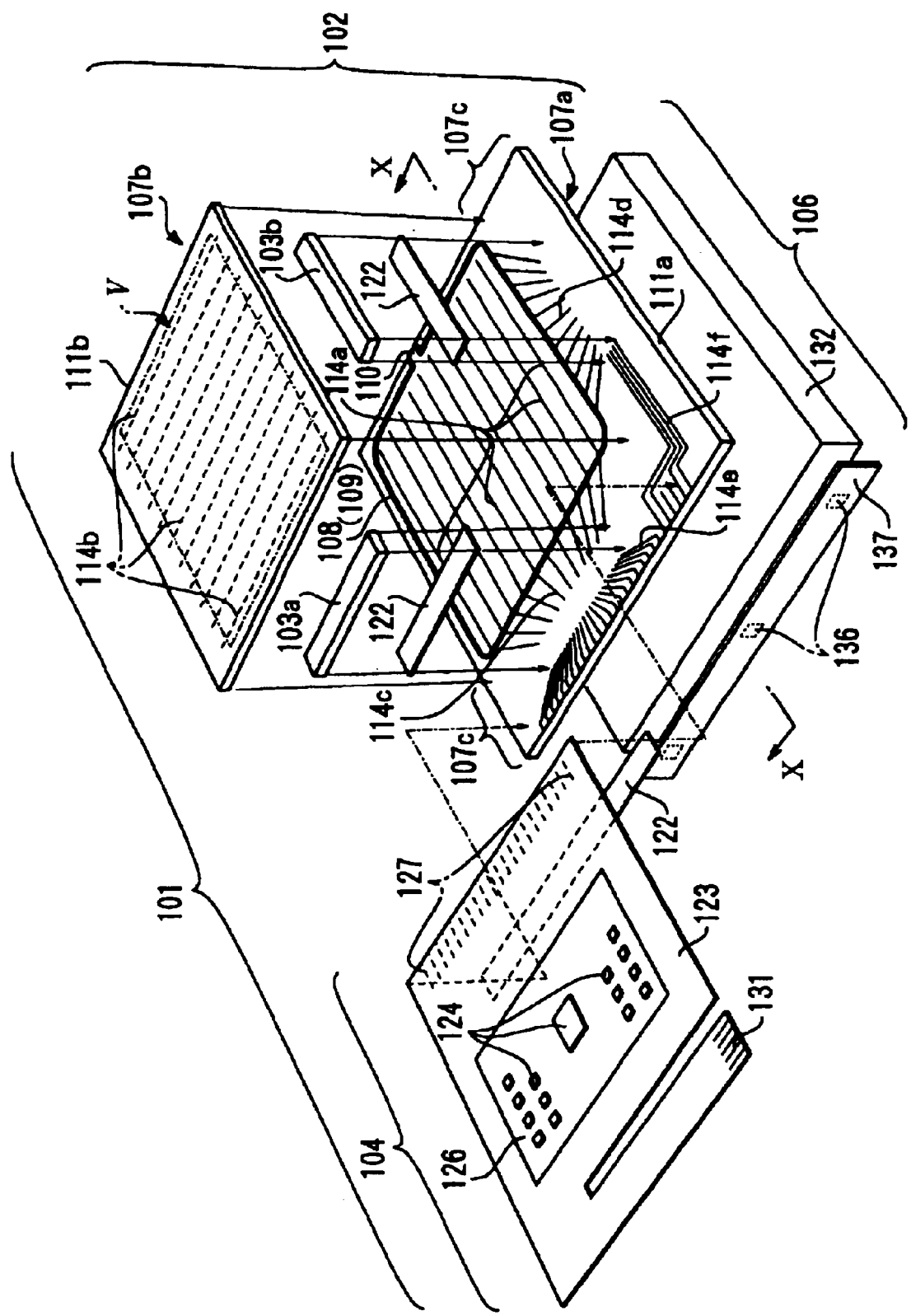
FIG. 15 is an assembly view of a liquid crystal display device in an embodiment of the present invention.
Figure 16:
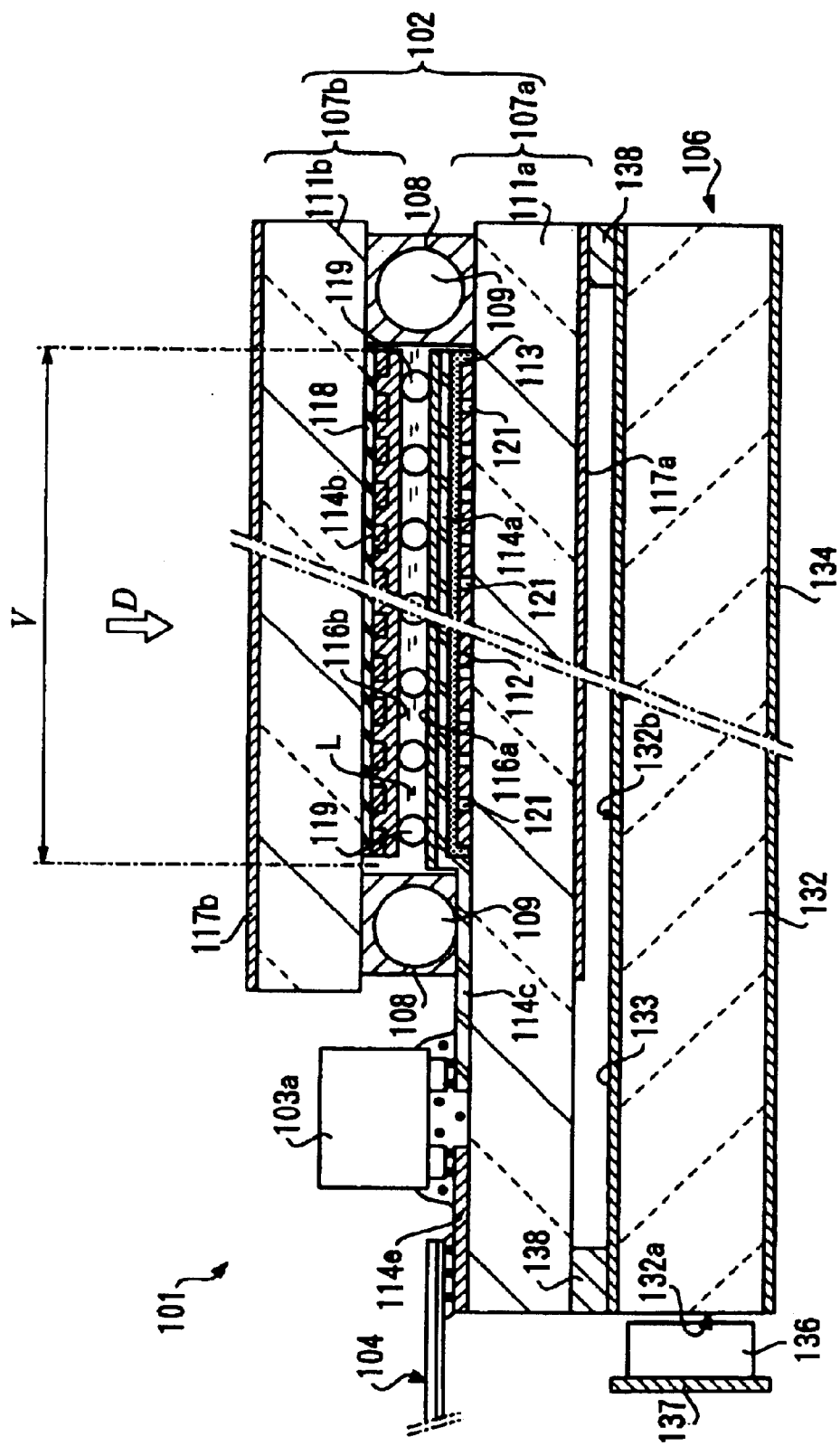
FIG. 16 is a sectional view of the liquid crystal display device taken along the line X—X of FIG. 15.

In the liquid crystal display device 101 shown in FIG. 15, liquid-crystal-driving ICs 103a and 103b as semiconductor chips are mounted on a liquid crystal panel 102, a FPC (Flexible Printed Circuit) 104 as a wiring connection element is connected to the liquid crystal panel 102, and an illumination device 106 as a backlight is provided on the rear face of the liquid crystal panel 102.

The liquid crystal panel 102 is formed by bonding the first substrate 107a and the second substrate 107b to each other with a sealing member 108. The sealing member 108 is formed, for example, by attaching an epoxy resin annularly to the inner surface of the first substrate 107a or the second substrate 107b by screen printing or the like. A spherical or cylindrical conductive member 109 composed of a conductive material is dispersed in the sealing member 108 as shown in FIG. 16.

The first substrate 107a includes a plate-like base member 111a composed of transparent glass, transparent plastic, or the like as shown in FIG. 16. A reflective film 112 may be formed on the inner surface of the base member 111a (i.e., on the upper surface in FIG. 16). An insulating film 113 is deposited thereon, the first electrodes 114a are formed on the insulating film 113 in a striped pattern viewed from the direction indicated by the arrow D (see FIG. 15), and an alignment film 116a is formed further thereon. A polarizer 117a is mounted on the outer surface of the base member 111a (i.e., on the lower surface in FIG. 16) by lamination or the like.

In FIG. 15, although the distance between the adjacent stripes is illustrated so as to be larger than the actual size and the number of the first electrodes 114a is illustrated so as to be smaller than the actual number in order to facilitate understanding of the array of the first electrodes 114a, more first electrodes 114a are actually formed on the base member 111a.

With reference to FIG. 16, the second substrate 107b includes a plate-like base member 111b composed of transparent glass, transparent plastic, or the like. A color filter 118 is formed on the inner surface of the base member 111b (i.e., the lower surface in FIG. 16), the second electrodes 114b are formed on the color filter 118 in a striped pattern viewed from the direction indicated by the arrow D (see FIG. 15) so as to be orthogonal to the first electrodes 114a, and an alignment film 116b is further formed thereon. A polarizer 117b is mounted on the outer surface of the base member 111b (i.e., on the upper surface in FIG. 16) by lamination or the like.

In FIG. 15, although the distance between the adjacent stripes is illustrated so as to be larger than the actual size and the number of the second electrodes 114b is illustrated so as to be smaller than the actual number in order to facilitate understanding of the array of the second electrodes 114b, more second electrodes 114b are actually formed on the base member 111b.

As shown in FIG. 16, in a gap surrounded by the first substrate 107a, the second substrate 107b, and the sealing member 108, i.e., in a so-called "cell gap", a liquid crystal, for example, a STN (Super Twisted Nematic) liquid crystal L is enclosed. Many minute and spherical spacers 119 are dispersed on the inner surface of the first substrate 107a or the second substrate 107b, and the uniform thickness of the cell gap is maintained because of the presence of the spacers 119 in the cell gap.

The first electrodes 114a and the second electrodes 114b are arrayed orthogonal to each other, and the intersections therebetween are arranged in a dot matrix when viewed from the direction indicated by the arrow D in FIG. 16. Each intersection of the dot matrix constitutes a display dot. In the color filter 118, the individual color elements of R (red), G (green), and B (blue) are arranged in a predetermined pattern, such as a stripe pattern, a delta pattern, or a mosaic pattern, when viewed from the direction indicated by the arrow D. Each display dot corresponds to any one of the color elements of R (red), G (green), and B (blue), and three display dots of three colors of R (red), G (green), and B (blue), as a unit, constitute a pixel.

By making a plurality of display dots, i.e., pixels, arrayed in a dot matrix, emit light selectively, images, such as characters and numeric characters, are displayed on the outer surface of the second substrate 107b of the liquid crystal panel 102. The region in which the images are displayed as described above is an-effective pixel region, and in FIGS. 15 and 16, the planar and rectangular region indicated by the arrow V corresponds to the effective display region.

The reflective film 112 shown in FIG. 16 is composed of a light-reflecting material, such as an Ag-based alloy or an Al-based alloy, and an aperture 121 is formed at the position corresponding to each of the display dots which are the intersections between the first electrodes 114a and the second electrodes 114b. Consequently, the apertures 121 are arrayed in the same dot matrix as the display dots when viewed from the D direction shown in FIG. 16.

The first electrodes 114a and the second electrodes 114b are, for example, composed of ITO which is a transparent conductive material. The alignment films 116a and 116b are formed by depositing a polyimide resin at a uniform thickness. The initial alignment of liquid crystal molecules on the surfaces of the first substrate 107a and second substrate 107b is determined by subjecting the alignment films 116a and 116b to rubbing treatment.

As shown in FIG. 15, the first substrate 107a has a larger area than that of the second substrate 107b, and the first substrate 107a has a protruding section 107c which protrudes outside the second substrate 107b when the substrates 107a and 107b are bonded to each other with the sealing member 108. On the protruding section 107c, various types of wiring are formed in appropriate patterns, such as leads 114c extending from the first electrodes 114a, leads 114d electrically connected to the second electrodes 114b on the second substrate 107b via the conductive member 109 (see FIG. 16) present in the sealing member 108, metal lines 114e connected to input bumps, i.e., input terminals, of the liquid-crystal-driving IC 103a, and metal lines 114f connected to input bumps of the liquid-crystal-driving IC 103b.

The leads 114c extending from the first electrodes 114a and the leads 114d electrically connected to the second electrodes 114b are composed of a conductive oxide, such as ITO, which is the same material as that for the electrodes. The metal lines 114e and 114f which are connected to the input sides of the liquid-crystal-driving ICs 103a and 103b are composed of a metallic material having a lower electrical resistance, such as an Ag-based alloy. The Ag-based alloy contains Ag as a primary constituent and Pd and Cu as incidental constituents, and for example, has a composition including 98% of Ag, 1% of Pd, and 1% of Cu.

The liquid-crystal-driving IC 103a and the liquid-crystal-driving IC 103b are bonded to the surface of the protruding section 107c by an ACF (Anisotropic Conductive Film) 122. That is, in this embodiment, a so-called "COG (Chip On Glass) type" liquid crystal panel is formed in which semiconductor chips are directly mounted on the substrate. In the COG-type mounting structure, bumps on the input side of the liquid-crystal-driving ICs 103a and 103b are electrically connected to the metal lines 114e and 114f, respectively, and bumps on the output side of the liquid-crystal-driving ICs 103a and 103b are electrically connected to the leads 114c and 114d, respectively, by conductive particles contained in the ACF 122.

With reference to FIG. 15, the FPC 104 can include a flexible resin film 123, a circuit 126 including chips 124, and metal line terminals 127. The circuit 126 is directly mounted on the resin film 123 by soldering or any other electrically connecting method. The metal line terminals 127 are composed of a conductive material, such as an Ag-based alloy, Cr, or Cu. The section of the FPC 104 provided with the metal line terminals 127 is connected to the section of the first substrate 107a provided with the metal lines 114e and the metal lines 114f by the ACF 122. The metal lines 114e and 114f on the substrate are electrically connected to the metal line terminals 127 on the FPC by the conductive particles contained in the ACF 122.

External connection terminals 131 are formed on the edge on the side of the FPC 104 opposite to the side where the metal line terminals 127 are formed, and the external connection terminals 131 are connected to external circuits not shown in the drawing. The liquid-crystal-driving ICs 103a and 103b are driven based on signals transmitted from the external circuits, and a scanning signal is supplied to one of the first electrode 114a and the second electrode 114b, and a data signal is supplied to the other. Thereby, voltage control is performed on the liquid crystal L present in the effective display region V for each display dot arrayed in a dot matrix, and as a result, alignment of the liquid crystal L is controlled for each display dot.

As shown in FIG. 15, the illumination device 106, which functions as a so-called backlight, includes a light guide 132 composed of an acrylic resin or the like, a diffusion sheet 133 provided on the light-emitting surface 132b of the light guide 132, a reflection sheet 134 provided on a surface opposite to the light-emitting surface 132b of the light guide 132, and a LED (Light Emitting Diode) 136 as a light-emitting source.

The LED 136 is supported by a LED substrate 137, and the LED substrate 137 is mounted on a support section (not shown in the drawing) integrally formed with the light guide 132. The LED substrate 137 is mounted at a predetermined position of the support section, and the LED 136 is placed so as to face a light-receiving surface 132a which is a side face of the light guide 132. Additionally, reference numeral 138 represents a buffer for buffering impact applied to the liquid crystal panel 102.

Light emitted by the LED 136 is received from the light-receiving surface 132a and is introduced into the light guide 132, and when the light is propagated while being reflected by the reflection sheet 134 and the wall surfaces of the light guide 132, the light is emitted as flat light from the light-emitting surface 132b through the diffusion sheet 133.

Since the liquid crystal display device 101 in this embodiment has the structure described above, when external light, such as sunlight and interior light, is sufficiently bright, with reference to FIG. 16, external light is brought into the liquid crystal panel 102 from the second substrate 107b side, and the light passes through the liquid crystal L and is reflected from the reflective film 112, and is then supplied again to the liquid crystal L. Alignment control is performed on the liquid crystal L for each display dot of R (red), G (green), and B (blue) by the electrodes 114a and 114b sandwiching the liquid crystal L, and as a result, the light supplied to the liquid crystal L is modulated for each display dot. Due to the modulation, light passing through the polarizer 117b and light incapable of passing through the polarizer 117b display images, such as characters and numeric characters on the outer side of the liquid crystal panel 102. Thus, a reflective display is performed.

On the other hand, when the quantity of external light is insufficient, the LED 136 emits light and flat light is emitted from the light-emitting surface 132b of the light guide 132. The light is supplied to the liquid crystal L through apertures 121 formed on the reflective film 112. At this stage, in the manner similar to that in the reflective display, the supplied light is modulated for each display dot by the liquid crystal L in which alignment control is performed, and thereby images are displayed outside. Thus, a transmissive display is performed.

Figure 17:
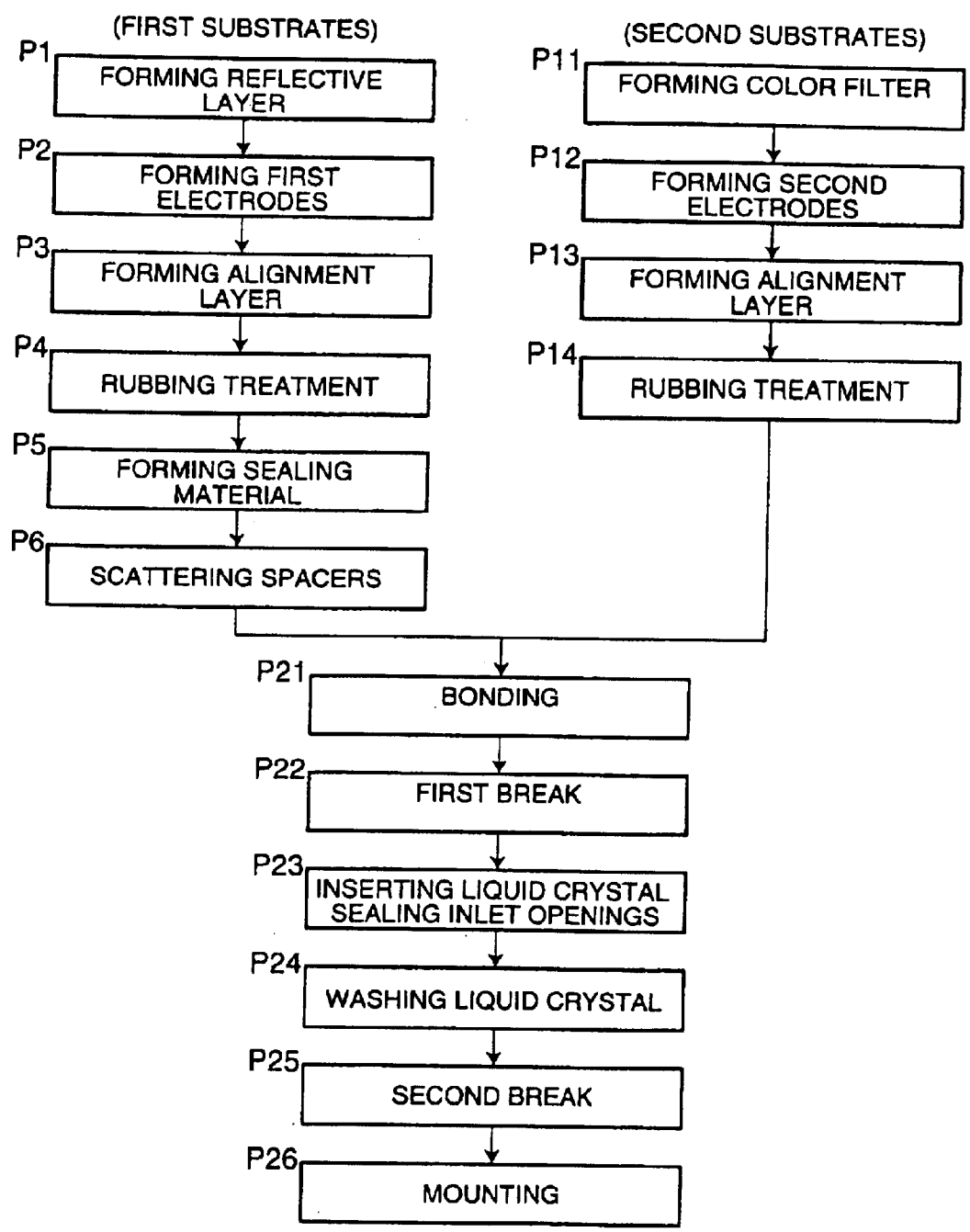
FIG. 17 is a flowchart which shows a method for manufacturing the liquid crystal display device shown in FIG. 15.
Figure 18:
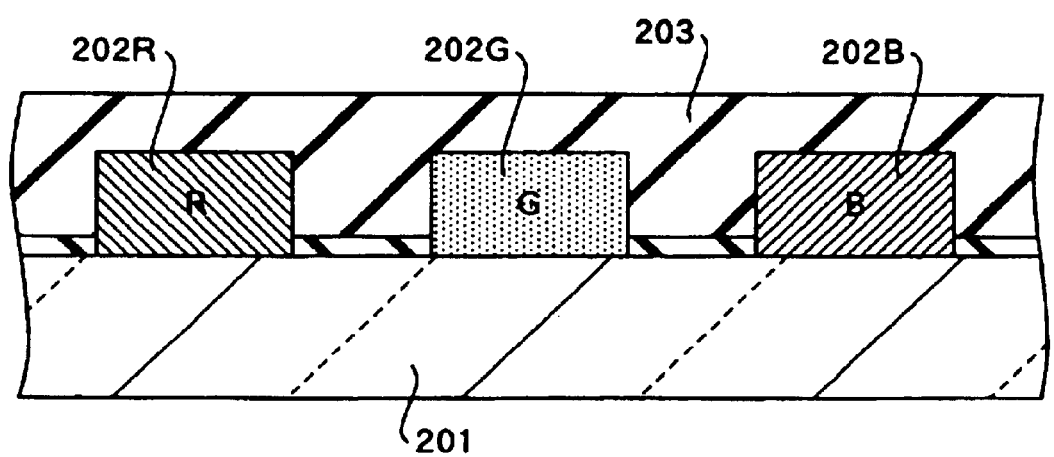
FIG. 18 is a sectional view showing one pixel section of a conventional color filter substrate.
Figure 19:
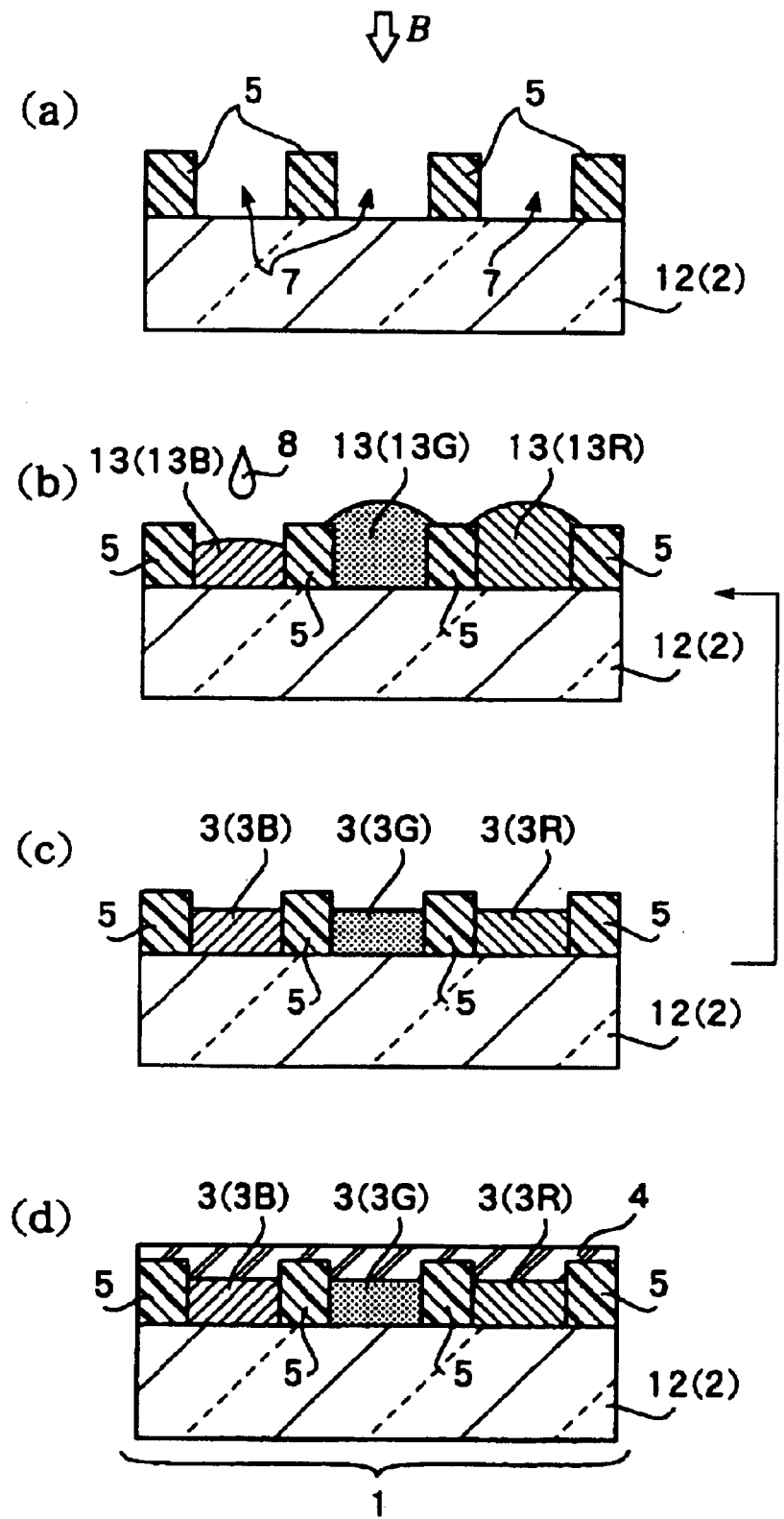
FIGS. 19(a) to 19(d) show the steps of a conventional method for manufacturing a color filter substrate.

The liquid crystal display device 101 having the structure described above is manufactured, for example, by a manufacturing method shown in FIG. 17. In the manufacturing method, a series of steps P1 to P6 concerns the formation of the first substrate 107a, and a series of steps P11 to P14 concerns the formation of the second substrate 107b. The first substrate formation process and the second substrate formation process are usually performed separately.

In the first substrate formation process, a reflective film 112 for a plurality of liquid crystal panels 102 is formed by photolithography or the like on the surface of a mother substrate having a large area composed of light-transmitting glass, light-transmitting plastic, or the like, and an insulating film 113 is formed thereon by a known deposition method (step P1). Next, first electrodes 114a, lines 114c, 114d, 114e, and 114f are formed by photolithography or the like (step P2).

Next, an alignment film 116a is formed on the first electrodes 114a by coating, printing, or the like (step P3), and rubbing treatment is performed on the alignment film 116a to determine the initial alignment of the liquid crystal (step P4). Next, a sealing member 108 is annularly formed, for example, by screen printing (step P5), and spherical spacers 119 are then dispersed thereon (step P6). A first mother substrate having a large area provided with a plurality of panel patterns formed on the first substrates 107a of the liquid crystal panels 102 is thus formed.

Separately from the first substrate formation process, the second substrate formation process (steps P11 to P14 shown in FIG. 17) is performed. First, a mother substrate having a large area composed of transparent glass, transparent plastic, or the like is prepared, and color filters for a plurality of liquid crystal panels 102 are formed thereon (step P11). The color filter formation step is performed, for example, by the manufacturing method shown in FIG. 4, and the color pixel formation step P3 and the protective layer formation step P5 are performed using the ink-jet apparatus 16 shown in FIG. 5 according to the method for controlling the ink-jet head shown in FIGS. 11, 13, 14, etc. Since the method for manufacturing the color filter and the method for controlling the ink-jet head have been described above, description thereof will be omitted.

After the light-shielding layer 6, the delimiting member 5, color pixels 3 are formed on the mother substrate 12 shown in FIG. 2(b) according to step P3 shown in FIG. 4, surface treatment is performed in order to improve wettability, and then the protective layer 4 is formed. Next, in step P12 shown in FIG. 17, the second electrodes 114b are formed by photolithography, and the alignment film 116b is formed by coating, printing, or the like (step P13). Rubbing treatment is performed on the alignment film 116b to determine the initial alignment of the liquid crystal (step P14). A second mother substrate having a large area provided with a plurality of panel patterns formed on the second substrates 107b of the liquid crystal panels 102 is thus formed.

After the first mother substrate and second mother substrate having large areas are thus formed, in step P21, the mother substrates are aligned with each other with the sealing member 108 therebetween and bonded together. Thereby, an empty panel structure including a plurality of panel sections in which a liquid crystal is not yet filled is prepared.

Next, scribing lines, i.e., cutting grooves, are formed at predetermined positions in the completed empty panel structure, and the panel structure is broken, i.e., cut, based on the scribing lines (step P22). Thereby, a so-called rectangular empty panel structure is formed, in which liquid-crystal-filling ports 110 (see FIG. 15) provided on the sealing member 108 in the individual liquid crystal panel sections are exposed.

Next, in step P23, the liquid crystal L is filled in the individual liquid crystal panels via the exposed liquid-crystal-filling ports 110, and the liquid-crystal-filling ports 110 are sealed with a resin or the like. In the liquid crystal filling process, usually, for example, a liquid crystal is stored in a storage container, and the storage container containing the liquid crystal and the rectangular empty panel are placed in a chamber. After the chamber is evacuated, the rectangular empty panel is immersed in the liquid crystal in the chamber, and the chamber is then exposed to atmospheric pressure. At this stage, since the inside of the empty panel is under vacuum, the liquid crystal pressurized by atmospheric pressure is introduced into the panel through the liquid-crystal-filling port. Since the liquid crystal adheres to the exterior of the liquid crystal panel structure after the filling of the liquid crystal, the rectangular panel filled with the liquid crystal is cleaned in step P24.

Scribing lines are then formed at predetermined positions on the rectangular mother panel which has been filled with the liquid crystal and cleaned, and the rectangular panel is cut based on the scribing lines. A plurality of liquid crystal panels are thereby cut out (step P25). On each liquid crystal panel 102 thus formed, as shown in FIG. 15, the liquid-crystal-driving ICs 103a and 103b are mounted, and the illumination device 106 is mounted as a backlight. The FPC 104 is further connected thereto, and thus the desired liquid crystal display device 101 is produced (step P26).

Additionally, although R (red), G (green), and B (blue) are used for color pixels in the embodiment described above, it should be understood that the color pixels are not limited to R (red), G (green), and B (blue), and, for example, C (cyan), M (magenta), and Y (yellow) may be used. In such a case, instead of materials for color pixels of R (red), G (green), and B (blue), materials for color pixels having the colors of C (cyan), M (magenta), and Y (yellow) are used.

Figure 7:
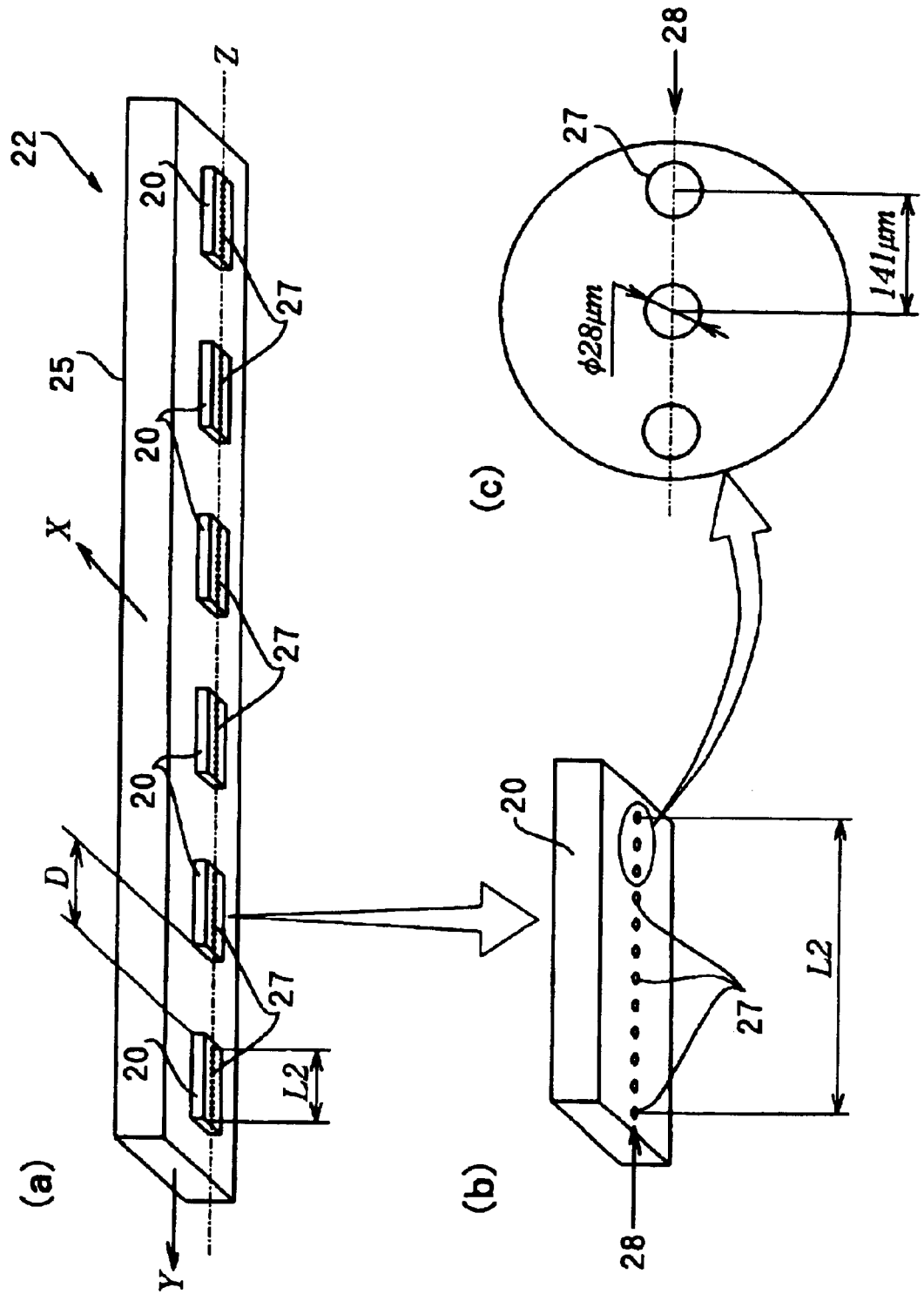
FIGS. 7(a) and 7(b) are perspective views of an ink-jet head used in the apparatus shown in FIG. 6 and a head section in an embodiment of the present invention.
FIG. 7(c) is an enlarged view of nozzles.

With respect to the ink-jet head 22 shown in FIG. 7, etc., although six head sections 20 are provided therein, the number of head sections may be increased and decreased from six.

Although a plurality of rows of color-filter-forming regions 11 are arranged in the mother substrate 12 shown in FIG. 2(b), one row of color-filter-forming regions 11 may be arranged in the mother substrate 12. Alternatively, one color-filter-forming region 11 which has substantially the same size as that of the mother substrate 12 or which is considerably smaller than the mother substrate 12 may be arranged in the mother substrate 12.

In the ink-jet apparatus 16 shown in FIGS. 5 and 6, the substrate 12 is subjected to main scanning by moving the ink-jet head 22 in the X direction and the substrate 12 is subjected to subscanning by the ink-jet head 22 by moving the substrate 12 in the Y direction by the subscanning drive unit 21. Instead of this, main scanning may be performed by moving the substrate 12 in the Y direction, and subscanning may be performed by moving the ink-jet head 22 in the X direction.

In the embodiment shown in FIG. 8, although the ink-jet head having the structure in which ink is ejected using deflection of the piezoelectric element 41 is used, an ink-jet head having any given structure may be used.

Figure 20:
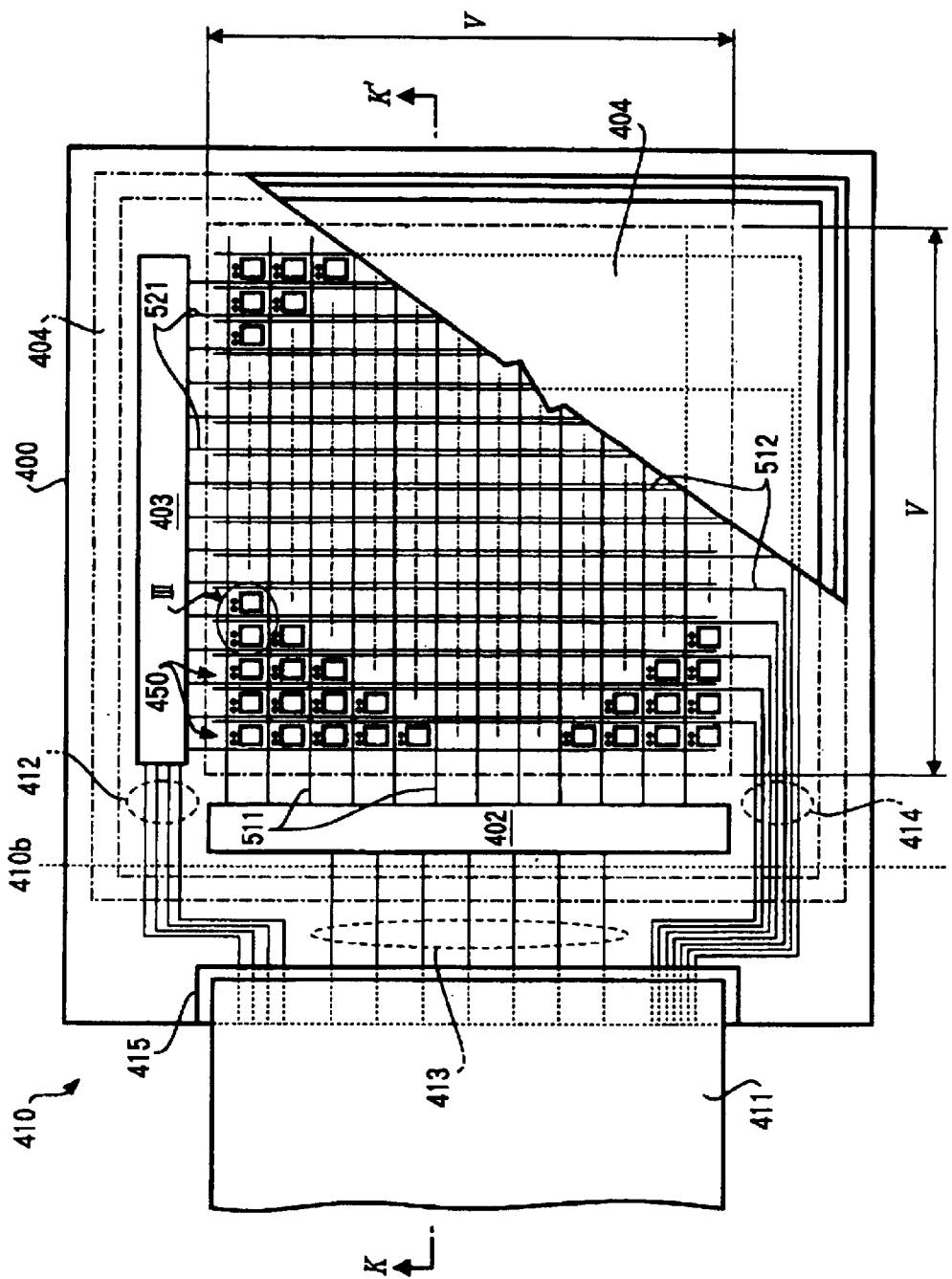
FIG. 20 is a plan view showing an organic EL device as the elector-optical device in an embodiment of the present invention.
Figure 21:
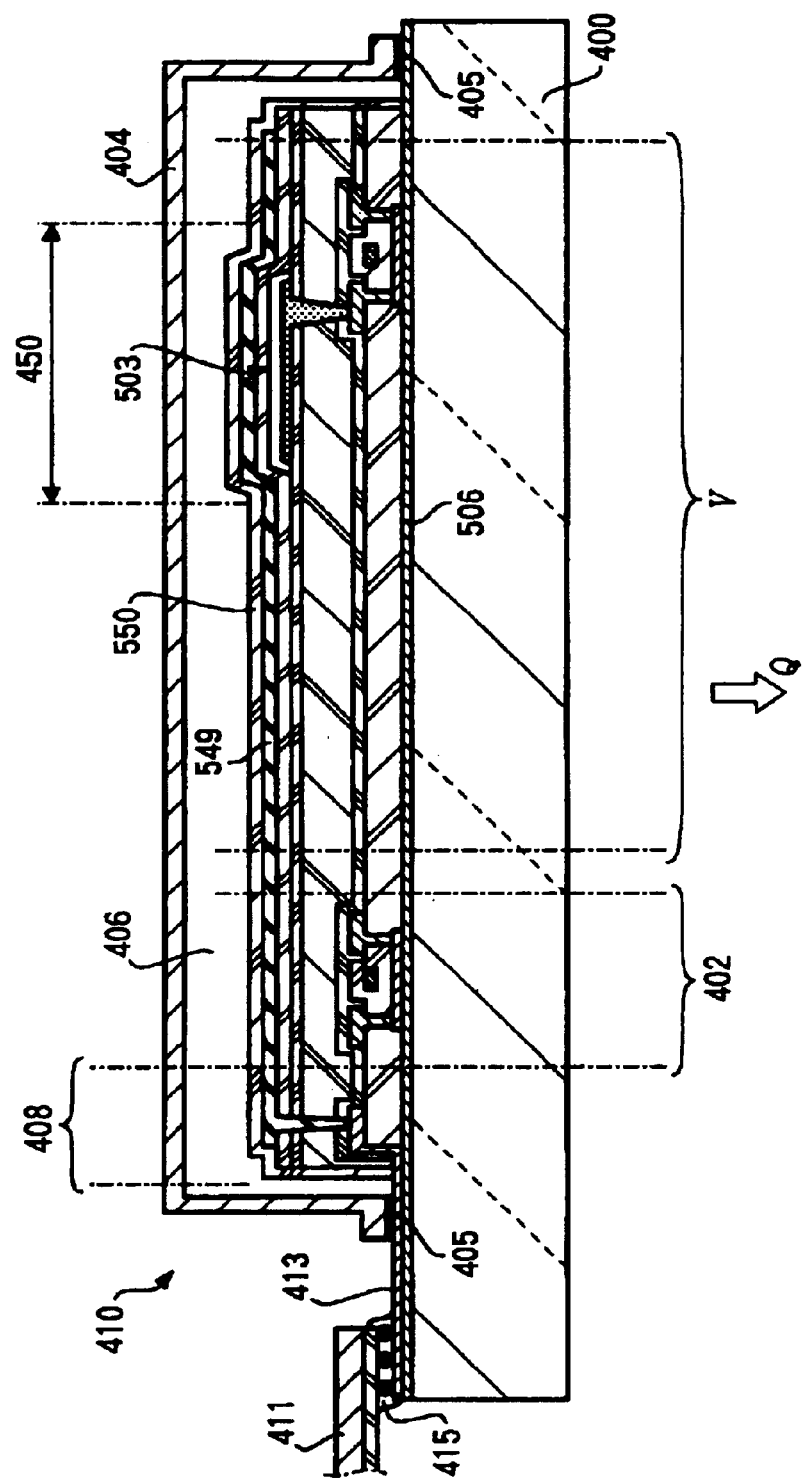
FIG. 21 is a sectional view showing the organic EL device taken along the line K–K' of FIG. 20.

FIG. 20 shows an embodiment in which the present invention is applied to an active matrix EL (Electroluminescence) device 410 as an example of electro-optical devices. FIG. 21 is a sectional view of the EL device 410 taken along the K–K' line of FIG. 20.

With reference to FIGS. 20 and 21, a region in which a plurality of pixels are formed, i.e., a display region V, a gate drive circuit 402, and a source drive circuit 403 are formed on a substrate 400. Various types of wiring from respective drive circuits reach a FPC 411 via input/output lines 412, 413, and 414, and are connected to external apparatuses. The FPC 411 is connected to the edge of the substrate 400 by an ACF (Anisotropic Conductive Film) 415. The substrate 400 is composed of, for example, a glass substrate, a glass ceramic substrate, a quartz substrate, a silicon substrate, a ceramic substrate, a metal substrate, a plastic substrate, or a plastic film.

A housing 404 is provided so as to surround at least the display region V, and preferably, so as to surround the drive circuits 402 and 403 and the display region V. The housing 404 has a shape provided with a recess with the internal height larger than the height of the display region V or a sheet-like shape not provided with such a recess. The housing 404 is bonded to the substrate 400 with an adhesive 405 so as to form a hermetically sealed space in conjunction with the substrate 400. At this stage, the EL device is completely enclosed in the hermetically sealed space and is completely shielded from air.

A plurality of housings 404 may be provided. The housing 404 is preferably composed of an insulating material, such as glass and a polymer. Examples of the insulating material include amorphous glass, such as borosilicate glass and quartz, crystallized glass, glass-ceramics, organic resins, such as acrylic resins, styrene resins, polycarbonate resins, and epoxy resins, and silicone resins. If the adhesive 405 is composed of an insulating material, a metallic material, such as a stainless alloy, may be used.

An adhesive, such an epoxy resin or an acrylate resin, may be used as the adhesive 405. A thermosetting resin or photo-curable resin may also be used as the adhesive. However, the adhesive 405 must be composed of a material that does not permeate oxygen and moisture as much as possible.

Preferably, an inert gas, such as argon, helium, or nitrogen, is filled in a space 406 between the housing 404 and the substrate 400. Instead of the inert gas, an inert liquid, for example, a liquid fluorinated carbon such as a perfluoroalkane, may be used. It is also effective to place a drying agent in the space 406, and as the drying agent, for example, barium oxide may be used.

As shown in FIG. 20, a plurality of display dots 450, each being independent, are arrayed in a matrix on the display region V. As shown in FIG. 21, all of the display dots 450 share a protective electrode 549 as a common electrode. The protective electrode 549 is connected to a portion of the input line 413 in a region 408 in the vicinity of the FPC411 within the housing 404. A predetermined voltage, for example, a ground potential, such as 0 V, is applied to the protective electrode 549 via the FPC 411 and the input/output lines 413.

Figure 22:
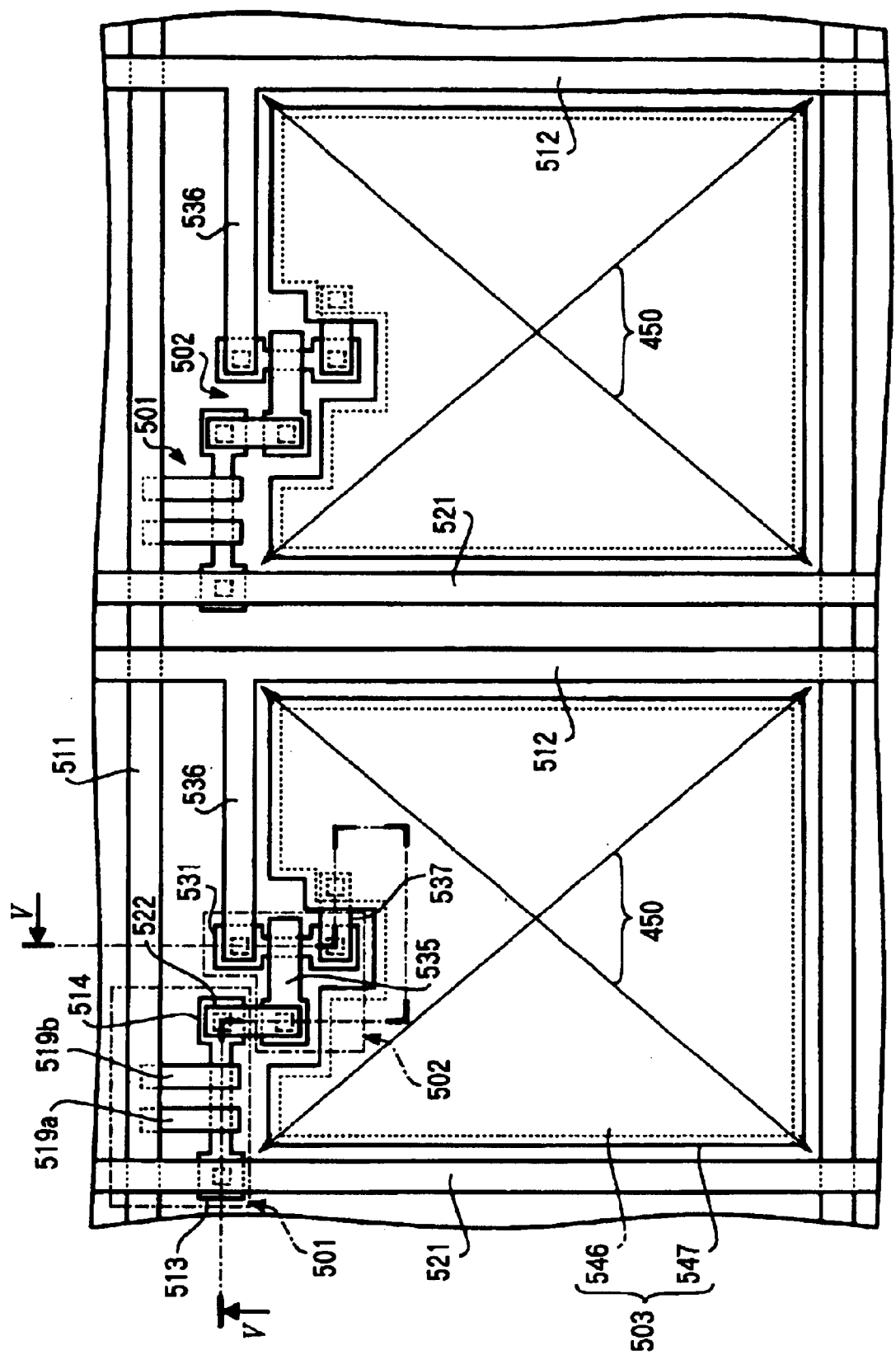
FIG. 22 is an enlarged plan view of the pixel sections according to the arrow III of FIG. 20.
Figure 23:
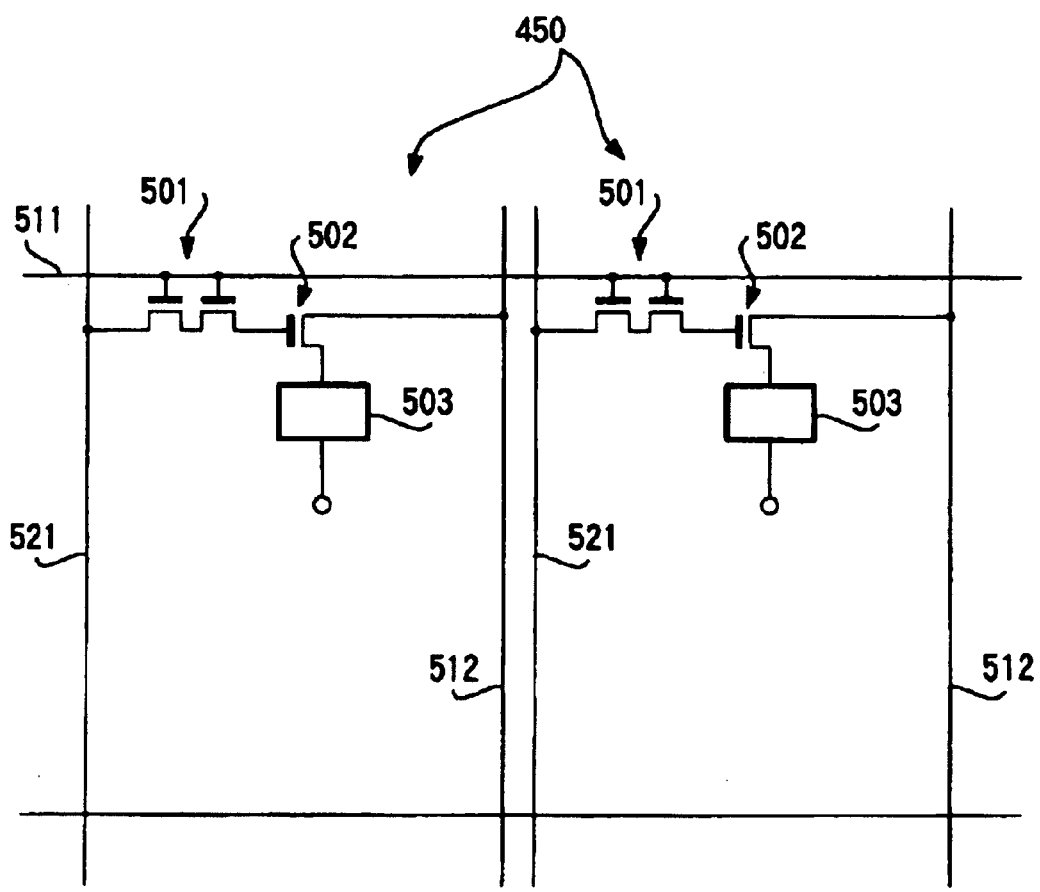
FIG. 23 is an equivalent circuit diagram corresponding to the pixel sections shown in FIG. 22.
Figure 24:
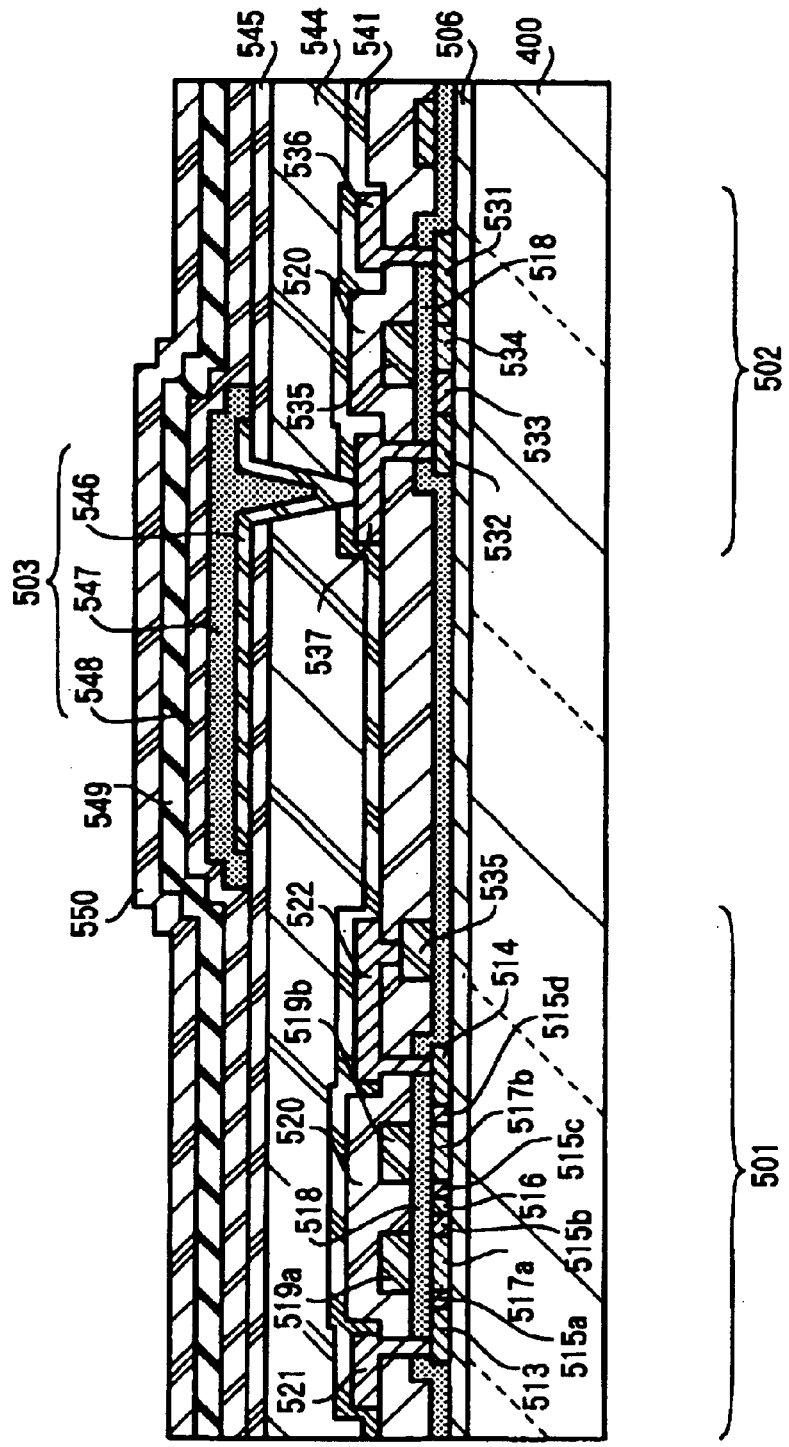
FIG. 24 is an enlarged sectional view showing the switching element section shown in FIG. 21.

FIG. 22 shows two adjacent display dots 450 indicated by the arrow III in FIG. 20. FIG. 23 is an equivalent circuit diagram showing the electrical circuit configuration in the display dots 450. FIG. 24 is a sectional view of an active element section for driving the EL device, taken along the line V—V of FIG. 22.

As shown in FIGS. 22 and 23, each display dot 450 includes a switching TFT 501 which functions as a switching element and a current-controlling TFT 502 which functions as a current-controlling element that controls volume of current to be applied to the EL device. The source of the switching TFT 501 is connected to a source line 521, the gate thereof is connected to a gate line 511, and the drain thereof is connected to the gate of the current-controlling TFT 502.

The source of the current-controlling TFT 502 is connected to a current-supplying line 512, and the drain thereof is connected to an EL device 503. The EL device 503 is a luminescent device having the structure in which an EL layer including a luminescent layer is sandwiched between an anode and a cathode. In FIG. 22, a pixel electrode 546 is shown as a substantially square anode, an EL layer 547 including the luminescent layer is deposited on the pixel electrode 546, and a cathode (not shown in the drawing) as a common electrode shared by the individual display dots 450 is deposited thereon. Such a layered structure constitutes the EL device 503.

With reference to FIG. 24, a color filter substrate 506 is formed on the substrate 400. As the color filter substrate 506, for example, the color filter substrate 1 shown in FIG. 1 may be used. Since the structure of the color filter substrate 1 and the manufacturing method thereof have been described, detailed description thereof will be omitted. In this embodiment, the delimiting member 5 is composed of a resin having repellency to the material for the color pixels 3 and to the material for the protective layer 4. The surface 5a of the delimiting member 5 is subjected to surface treatment to decrease the repellency to the liquid material for the protective layer 4.

Due to the features with respect to the delimiting member 5 described above, the surface of the protective layer 4 is planarized with high precision. Therefore, it is possible to form other film elements on the surface of the color filter substrate 506 at desired positions, at desired sizes, and with high precision. Additionally, the individual color pixels 3 constituting the color filter substrate 1 are provided in a region at least larger than the effective display region V shown in FIG. 21.

In this embodiment, as shown in FIG. 22, in one display dot 450, two TFTs, specifically, the switching TFT 501 which functions as a switching element and the current-controlling TFT 502 which functions as a current-controlling element for controlling the amount of current flowing to the EL device, are provided. Although these TFTs are formed as n-channel TFTs in this embodiment, both or either one of them may be formed as a p-channel TFT.

With reference to FIG. 24, the switching TFT 501 includes an active layer including five types of elements; i.e., a source region 513, a drain region 514, LDD (Lightly doped Drain) regions 515a, 515b, 515c, and 515d, a high-concentration impurity region 516, and channel-forming regions 517a and 517b. The switching TFT 501 also includes a gate insulating film 518, gate electrodes 519a and 519b, a first interlayer insulating film 520, a source line 521 and a drain line 522.

As shown in FIG. 22, the gate electrodes 519a and 519b are electrically connected to each other by the gate line 511 composed of a material that is different from and has a lower resistance than those of the gate electrodes 519a and 519b, and thus a double gate structure is formed. Of course, instead of the double gate structure, a so-called "multi-gate" structure, such as a triple gate structure, i.e. the structure that includes an active layer comprising at least two channel-forming regions connected in series, may be formed.

The active layer is composed of a semiconductor film containing a crystal structure, i.e., a monocrystalline semiconductor film, a polycrystalline semiconductor film, or a microcrystalline semiconductor film. The gate electrodes 519a and 519b, the source line 521, and the drain line 522 may be composed of any type of conductive film. In the switching TFT 501, the LDD regions 515a to 515d are provided so as not to overlap the gate electrodes 519a and 519b with the gate insulating film 518 being placed therebetween. Such a structure is significantly effective in reducing the off-state current.

Next, with reference to FIG. 24, the current-controlling TFT 502 includes an active layer including four types of elements, i.e., a source region 531, a drain region 532, a LDD region 533, and a channel-forming region 534, and a gate insulating film 518, a gate electrode 535, a first interlayer insulating film 520, a source line 536, and a drain line 537. Although the gate electrode 535 has a single gate structure, a multi-gate structure may be used instead.

With reference to FIG. 24, the drain of the switching TFT 501 is connected to the gate of the current-controlling TFT. Specifically, the gate electrode 535 of the current-controlling TFT 502 is electrically connected to the drain region 514 of the switching TFT 501 via the drain line 522. The source line 536 is connected to the current-supplying line 512.

The current-controlling TFT 502 supplies a current to make the EL device 503 emit light while controlling the amount of current supply to enable gray-scale display. Therefore, degradation-preventing measures must be taken by hot carrier implantation so that degradation is prevented even a current is applied. When black is displayed, the current-controlling TFT 502 is turned off, and in such a case, if the off-state current is high, it is not possible to obtain satisfactory black display, resulting in a decrease in contrast. Therefore, preferably, the off-state current is suppressed.

With reference to FIG. 24, a first passivation film 541 is formed on the first interlayer insulating film 520. The first passivation film 541 is, for example, composed of an insulating film containing silicon. The first passivation film 541 protects the resultant TFT from alkali metals and water. An EL layer provided above the TFT in the final stage contains an alkali metal, such as sodium. That is, the first passivation film 541 functions as a protective layer which prevents such an alkali metal from entering the TFT.

If the first passivation film 541 is formed so as to have a heat-dissipating function, it is also possible to prevent thermal degradation of the EL layer. In the structure shown in FIG. 24, since the substrate 400 is irradiated with light, the first passivation film 541 must transmit light. When an organic material is used as the EL layer, since the EL layer is degraded due to bonding with oxygen, preferably, an insulating film which easily emits oxygen is not used.

A second interlayer insulating film 544 is formed on the first passivation film 541 so as to cover the individual TFTs. The second interlayer insulating film 544 planarizes the steps formed by the TFTs. As the second interlayer insulating film 544, for example, an organic resin film composed of a polyimide, a polyamide, or an acrylic resin may be used. Of course, if satisfactory planarization is enabled, an inorganic film may be used.

Since the EL layer is very thin, if the surface where to form the EL layer has steps, insufficient light emission may occur. Therefore, it is important to planarize the steps formed by the TFTs using the second interlayer insulating film 544 so that the EL layer formed thereon functions normally.

A second passivation film 545 is formed on the second interlayer insulating film 544. The second passivation film 545 prevents penetration of the alkali metal from the EL device. The second passivation film 545 may be composed of the same material as that of the first passivation film 541. The second passivation film 545 preferably also functions as a heat-dissipating layer which dissipates heat generated at the EL device. Such heat-dissipating function prevents the accumulation of heat in the EL device.

A pixel electrode 546 is formed on the second passivation film 545. The pixel electrode 546 is, for example, composed of a transparent conductive film, and functions as the anode of the EL device. With respect to the formation of the pixel electrode 546, a contact hole, i.e., opening, is formed in the second passivation film 545, the second interlayer insulating film 544, and the first passivation film 541, and the pixel electrode 546 is formed so as to connect to the drain line 537 of the current-controlling TFT 502 in the contact hole.

The EL layer 547 is formed on the pixel electrode 546. The EL layer 547 has a single layer structure or a multilayer structure, and in many cases, multilayer structures are used. In the EL layer 547, a hole injection layer, a hole transport layer, or a luminescent layer is directly in contact with the pixel electrode 546. In this embodiment, the luminescent layer emits white light, and a color display is performed when the white light passes through the R, G, and B color pixel regions in the color filter substrate 506.

A cathode 548 is formed on the EL layer 547, and a protective electrode 549 is further formed thereon. The cathode 548 and the protective electrode 549 are formed, for example, by vacuum deposition. Additionally, if the cathode 548 and the protective electrode 549 are continuously formed without exposure to air, it is possible to suppress the degradation of the EL layer 547. A light-emitting device including the pixel electrode 546, the EL layer 547, and the cathode 548 corresponds to the EL device 503.

As the cathode 548, a material including magnesium (Mg), lithium (Li), or calcium (Ca) having a small work function may be used. The protective electrode 549 is provided to protect the cathode 548 from outside moisture, etc., and may be composed of a material including aluminum (Al) or silver (Ag). The protective electrode 549 also has a heat-dissipating effect.

A third passivation film 550 is formed on the protective electrode 549. The third passivation film 550 protects the EL layer 547 from moisture, and also may be formed so as to have a heat-dissipating function, as necessary, in the same manner as that of the second passivation film 545. Additionally, when an organic material is used as the EL layer, since the organic material may be degraded due to bonding with oxygen, preferably, an insulating film which easily emits oxygen is not used as the third passivation film 550.

In this embodiment, as shown in FIG. 20, TFTs having the optimum configuration are directly formed on the substrate 400 in the drive circuits 402 and 403 in addition to in the display region V, and thus high reliability is achieved with respect to operation. Additionally, herein, examples of drive circuits include shift registers, buffers, level shifters, and sampling circuits. When digital drive is employed, signal-converting circuits, such as D/A converters may also be included.

In addition to the display region V and the circuit configuration, such as drive circuits 402 and 403, logic circuits, such as signal split circuits, D/A converter circuits, operational amplifier circuits, and g correction circuits, may be formed directly on the substrate 400. Moreover, memory sections, microprocessors, etc., may be formed directly on the substrate 400.

Since the EL device 410 according to this embodiment has the construction described above, with reference to FIG. 20, either one of a scanning signal and a data signal is supplied to the gate line 511 by the gate drive circuit 402, and the other one of a scanning signal and a data signal is supplied to the source line 521 by the source drive circuit 403. On the other hand, a current to make the EL device emit light is supplied to the current-controlling TFT 502 in each display dot 450 by the current-supplying line 512.

Some display dots among a plurality of display dots arrayed in a matrix in the display region V are selected appropriately, and during the period of selection, the switching TFT 501 is turned on, and thus the data voltage is written. During the period of non-selection, the TFT is turned off, and thus the voltage is maintained. Due to such switching and storing operations, some display dots among a plurality of display dots selectively emit light, and by the set of light-emitting dots, images, such as characters, numeric characters, and graphics are displayed toward the back of the sheet in FIG. 20, i.e., in the direction indicated by the arrow Q in FIG. 21. Since light from the EL device 503 passes through the color filter substrate 506, the display image is a color image.

While the present invention has been described with reference to what are presently considered to be the preferred embodiments, it is to be understood that the invention is not limited to the disclosed embodiments. The invention is intended to cover various modifications and equivalent arrangements included within the spirit and scope of the present invention.

For example, it should be understood that the electro-optical devices are not limited to liquid crystal display devices and EL devices and may include any device in which a color filter substrate is formed on a substrate. Examples of electro-optical devices to which the present invention is applicable include inorganic electroluminescence devices, PDP (Plasma Display) devices, EPD (Electrophoretic Display) devices, FED (Field Emission Display) devices and the like.

Although the liquid crystal display device shown in FIG. 15 is a simple matrix liquid crystal display device, the present invention is also applicable to an active matrix liquid crystal display device in which a two-terminal switching element, such as a TFD (Thin Film Diode), is used as the active element, an active matrix liquid crystal display device in which a three-terminal switching element, such as a TFT (Thin film Transistor) is used as the active element, etc.

Examples of electronic apparatuses including liquid crystal display devices as the electro-optical devices in accordance with the present invention will be described below.

Figure 25:
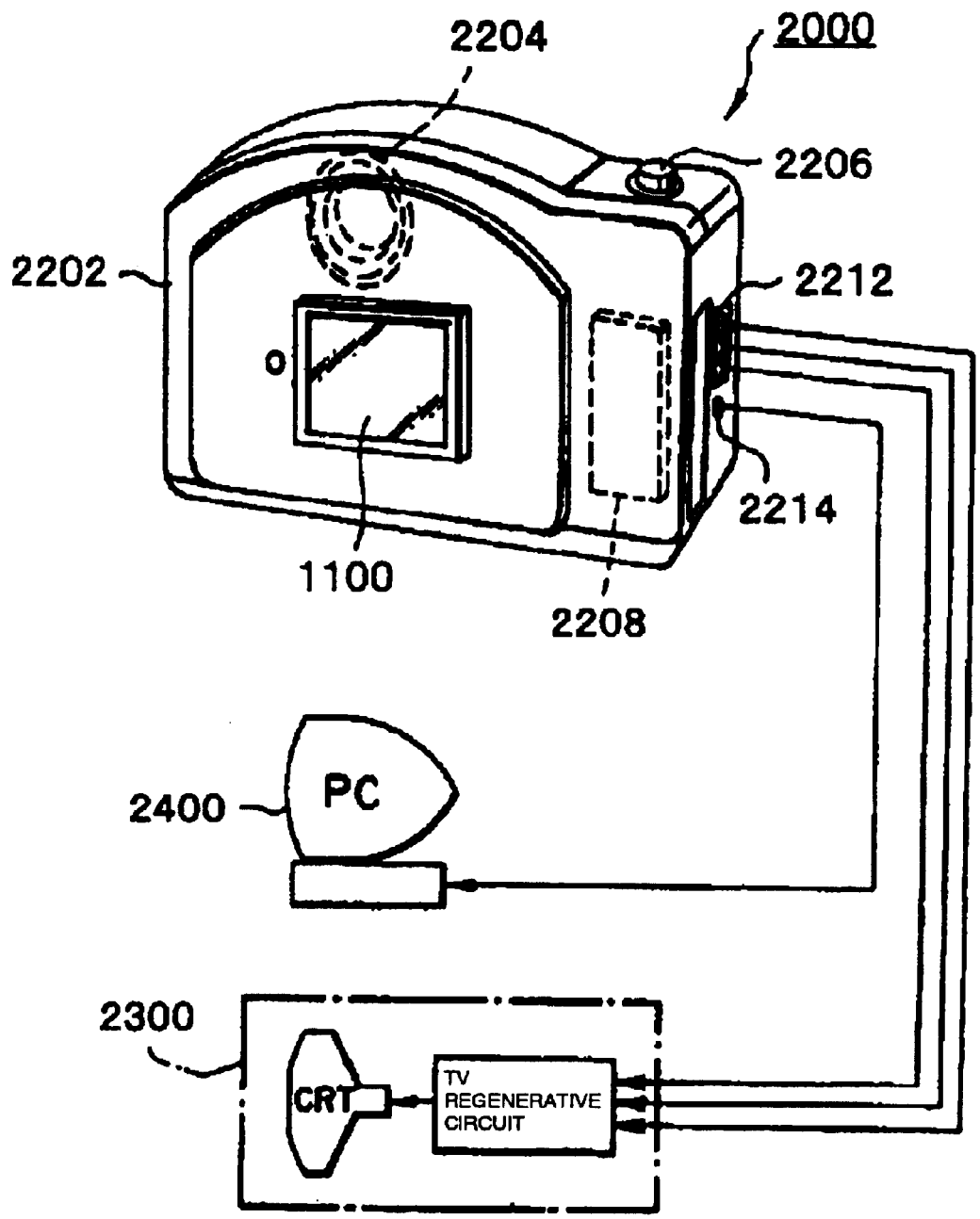
FIG. 25 is a perspective view showing a digital still camera as an example of electronic apparatuses of the present invention.

A digital still camera in which a liquid crystal display device 1100 according to the forth embodiment of the present invention is used as a finder will be described. FIG. 25 is a perspective view of the digital still camera and also schematically shows connection to external apparatuses.

While a film is exposed to light by the light figure of an object in the ordinary camera, in the digital still camera 2000, the light image of an object is photoelectrically converted by an imaging device, such as a CCD (Charge Coupled Device) to generate imaging signals. Herein, a liquid crystal panel of the liquid crystal display device 1100 is provided on the back face (front side in FIG. 25) of a case 2202 of the digital still camera 2000, and a display is performed based on the imaging signal by the CCD. Consequently, the liquid crystal display device 1100 functions as a finder for displaying an object. A light-receiving unit 2204 including an optical lens and a CCD is provided on the front face of the case 2202 (back side in FIG. 25).

When a photographer confirms the image of the object displayed on the liquid crystal display device 1100 and pushes a shutter 2206, the imaging signal of the CCD at that point is transferred to and stored in the memory of a circuit substrate 2208. In this digital still camera 2000, video signal output terminals 2212 and input/output terminal 2214 for data communication are provided on the side of the case 2202. As shown in FIG. 25, as necessary, a TV monitor 2300 can be connected to the signal output terminals 2212, and a personal computer 2400 is connected to the input/output terminal 2214 for data communication. Furthermore, by predetermined operation, the image signal stored in the memory of the circuit substrate 2208 is output to the TV monitor 2300 and the personal computer 2400.

FIGS. 26(A), (B), and (C) are outline views of other electronic apparatuses including liquid crystal display devices as the electro-optical devices according to the present invention. FIG. 26(A) shows a mobile phone 3000, which includes a liquid crystal display device 1100 provided on the upper front surface thereof. FIG. 26(B) shows a wristwatch 4000, which includes a display section using a liquid crystal display device 1100 provided on the center front surface of the body thereof. FIG. 26(C) shows a mobile information apparatus 5000, which includes a display section including a liquid crystal display device 1100 and an input section 5100.

These electronic apparatuses include, besides the liquid crystal display devices 1100, display signal generation sections which include display information output sources, various circuits, such as display information processing circuits and clock generation circuits, and power supply circuits for supplying power to such circuits, although now shown in the figure. For example, in the mobile information apparatus 5000, display signals generated by the display signal generation section based on information, etc. input from the input section 5100 are supplied to the display section, and thus a display image is formed.

It should be understood that the electronic apparatuses in which the liquid crystal display device 1100 of the present invention is built are not limited to digital still cameras, mobile phones, wristwatches, and mobile information apparatuses, and are also used for various other electronic apparatuses, such as electronic pocket diaries, pagers, POS terminals, IC cards, minidisk players, liquid crystal projectors, personal computers (PCs) for multi-media use, engineering workstations (EWSs), notebook type personal computers, word processors, televisions, viewfinder type or monitor-direct-view type video tape recorders, electronic desktop calculators, car navigating apparatuses, apparatuses provided with touch panels, clocks and the like.

As described above, in accordance with the present invention, since the delimiting member is composed of a resin having repellency to the color pixel material and the protective layer material, and the surface of the delimiting member is subjected to surface treatment to decrease the repellency to the liquid material for the protective layer, the protective layer constituting the color filter substrate can be formed so that the surface thereof has excellent flatness.

Therefore, when electrodes are formed on the surface of the color filter substrate, disconnection of the electrodes can be effectively prevented. When the color filter substrate is used as an element for a display device, it is possible to reduce variations in color tone in the image displayed by the display device.

While this invention has been described in conjunction with the specific embodiments thereof, it is evident that many alternatives, modifications and variations will be apparent to those skilled in the art. Accordingly, preferred embodiments of the invention as set forth herein are intended to be illustrative not limiting. There are changes that may be made without departing from the spirit and scope of the invention.

What is claimed is:

1. A color filter substrate, comprising:
   a base member;
   a bank-like delimiting member formed at a predetermined height on the base member so as to delimit color-pixel-forming regions having a predetermined pattern on a surface of the base member;
   color pixels formed in the color-pixel-forming regions on the surface of the base member by applying liquid color pixel materials; and
   a protective layer formed on surfaces of the color pixels by applying a liquid protective layer material having a viscosity of 3 to 50 mPa·s.
   the delimiting member comprising a resin having repellency to the color pixel materials and to the protective layer material; and
   a surface of the delimiting member being subjected to surface treatment to decrease the repellency to the protective layer material.

2. The color filter substrate according to claim 1, the delimiting member further comprising a material including at least one of a fluorocarbon resin and a silicone resin, and the protective layer comprising a material including at least one resin selected from the group of acrylic resins, epoxy resins, imide resins, and fluorocarbon resins.

3. The color filter substrate according to claim 1, the surface treatment comprising at least one of oxygen ($O_2$) plasma ashing, atmospheric plasma ashing, and UV ashing.

4. The color filter substrate according to claim 3, the surface treatment being performed so that the contact angle of the protective layer with respect to the base member is 20° or less.

5. The color filter substrate according to claim 1, further comprising a light-shielding layer formed in a predetermined pattern on the surface of the base member, the delimiting member being formed on a surface of the light-shielding layer.

6. The color filter substrate according to claim 5, the light-shielding layer functioning as a black mask.

7. The color filter substrate according to claim 1, the delimiting member having a light-shielding effect, and the delimiting member also functioning as a light-shielding layer.

8. The color filter substrate according to claim 7, the light-shielding layer functioning as a black mask.

9. A method for manufacturing a color filter substrate, comprising:
   forming a bank-like delimiting member at a predetermined height on a base member so as to delimit color-pixel-forming regions having a predetermined pattern on a surface of the base member;
   forming color pixels by applying liquid color pixel materials to the color-pixel-forming regions on the surface of the base member; and
   forming a protective layer by applying a liquid protective layer material, having a viscosity of 3 to 50 mPa·s, to surfaces of the color pixels,
   the delimiting member comprising a resin having repellency to the color pixel materials and to the protective layer material; and
   a surface of the delimiting member being subjected to surface treatment to decrease the repellency to the protective layer material.

10. The method for manufacturing a color filter substrate according to claim 9, the delimiting member further comprising a material including at least one of a fluorocarbon resin and a silicone resin, and the protective layer comprising a material comprising at least one resin selected from the group of acrylic resins, epoxy resins, imide resins, and fluorocarbon resins.

11. The method for manufacturing a color filter substrate according to claim 9, surface treatment comprising at least one of oxygen ($O_2$) plasma ashing, atmospheric plasma ashing, and UV ashing.

12. The method for manufacturing a color filter substrate according to claim 11, the surface treatment being performed so that the contact angle of the protective layer with respect to the base member is 20° or less.

13. The method for manufacturing a color filter substrate according to claim 9, further comprising forming a light-shielding layer in a predetermined pattern on the surface of the base member, the delimiting member being formed on a surface of the light-shielding layer.

14. The method for manufacturing a color filter substrate according to claim 9, the delimiting member being formed so as to have a light-shielding effect and the delimiting member functioning as a light-shielding layer.

15. The method for manufacturing a color filter substrate according to claim 9, the color pixels being formed by ejecting droplets of the color pixel materials into the color-pixel-forming regions.

16. The method for manufacturing a color filter substrate according to claim 9, the protective layer being formed by ejecting droplets of the protective layer material onto the surfaces of the color pixels.

17. A liquid crystal display device, comprising:
a color filter substrate;
pixel electrodes formed on the color filter substrate;
an opposing substrate opposing the color filter substrate; and
a liquid crystal disposed between the color filter substrate and the opposing substrate,
the color filter substrate comprising:
a base member;
a bank-like delimiting member formed at a predetermined height on the base member so as to delimit color-pixel-forming regions having a predetermined pattern on a surface of the base member;
color pixels formed in the color-pixel-forming regions on the surface of the base member by applying liquid color pixel materials; and
a protective layer formed on surfaces of the color pixels by applying a liquid protective layer material having a viscosity of 3 to 50 mPa·s,
the delimiting member included in the color filter substrate comprising a resin having repellency to the color pixel materials and to the protective layer material; and
the surface of the delimiting member being subjected to surface treatment to decrease the repellency to the protective layer material.

18. The liquid crystal display device according to claim 17, the delimiting member further comprising a material including at least one of a fluorocarbon resin and a silicone resin, and the protective layer comprising a material including at least one resin selected from the group of acrylic resins, epoxy resins, imide resins, and fluorocarbon resins.

19. The liquid crystal display device according to claim 17, wherein, in the color filter substrate, the surface treatment is performed by at least one of oxygen (O2) plasma ashing, atmospheric plasma ashing, and UV ashing.

20. The liquid crystal display device according to claim 19, wherein, in the color filter substrate, the surface treatment is performed so that the contact angle of the protective layer with respect to the base member is 20° or less.

21. The liquid crystal display device according to claim 17, the color filter substrate further comprising a light-shielding layer formed in a predetermined pattern on the surface of the base member, the delimiting member being formed on a surface of the light-shielding layer.

22. The liquid crystal display device according to claim 17, wherein, in the color filer substrate, the delimiting member is formed so as to have a light-shielding effect and the delimiting member also functions as a light-shielding layer.

23. The liquid crystal display device according to claim 17, the liquid crystal comprising at least one of a STN (Super Twisted Nematic) liquid crystal and a TN (Twisted Nematic) liquid crystal.

24. An electronic apparatus comprising the liquid crystal display device according to claim 17.

25. An electro-optical device comprising a color filter substrate and an electro-optical material provided on the color filter substrate, the color filter substrate, comprising:
a base member;
a bank-like delimiting member formed at a predetermined height on the base member so as to delimit color-pixel-forming regions having a predetermined pattern on a surface of the base member;
color pixels formed in the color-pixel-forming regions on the surface of the base member by applying liquid color pixel materials; and
a protective layer formed on surfaces of the color pixels by applying a liquid protective layer material having a viscosity of 3 to 50 mPa·s,
the delimiting member included in the color filter substrate comprising a resin having repellency to the color pixel materials and to the protective layer material; and
a surface of the delimiting member being subjected to surface treatment to decrease the repellency to the protective layer material.

26. An electronic apparatus comprising the electro-optical device according to claim 25.

27. An electro-optical device, comprising:
a base member;
a bank-like delimiting member formed on the base member so as to delimit color-pixel-forming regions on a surface of the base member;
color pixels formed in the color-pixel-forming regions by applying liquid color pixel materials; and
a protective layer formed on the delimiting member and the color pixels by applying a liquid protective layer material having a viscosity of 3 to 50 mPa·s,
the delimiting member comprising a material having low wettability to the liquid color pixel materials and to the liquid protective layer material; and
a surface of the delimiting member in the section in contact with the protective layer material being subjected to surface treatment to increase the wettability to the liquid protective layer material compared to the remaining section.

28. A method for manufacturing an electro-optical device, comprising the steps:
forming a bank-like delimiting member comprising a material having low wettability to color pixel materials and to a protective layer material on a base member so as to delimit color-pixel-forming regions on a surface of the base member;
forming color pixels by ejecting droplets of the color pixel materials into the color-pixel-forming regions from nozzles;
surface-treating an exposed section of a surface of the delimiting member so as to improve the wettability compared to the remaining section; and
forming a protective layer by applying liquid protective layer material, having a viscosity of 3 to 50 mPa·s, onto the delimiting member and the color pixels.

* * * * *